(12) United States Patent
Yamamoto et al.

(10) Patent No.: US 8,836,983 B2
(45) Date of Patent: Sep. 16, 2014

(54) INFORMATION PROCESSING DEVICE, IMAGE FORMING APPARATUS, AND NON-TRANSITORY COMPUTER READABLE MEDIUM

(75) Inventors: Hiroaki Yamamoto, Kanagawa (JP); Jyunya Yamada, Kanagawa (JP); Tadashi Hata, Kanagawa (JP); Toshiharu Hayashida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 285 days.

(21) Appl. No.: 13/558,766

(22) Filed: Jul. 26, 2012

(65) Prior Publication Data

US 2013/0235417 A1 Sep. 12, 2013

(30) Foreign Application Priority Data

Mar. 6, 2012 (JP) ................................. 2012-049643

(51) Int. Cl.
*G06F 3/12* (2006.01)

(52) U.S. Cl.
USPC ........................... 358/1.15; 358/1.1; 358/1.13

(58) Field of Classification Search
None
See application file for complete search history.

(56) References Cited

U.S. PATENT DOCUMENTS 8,659,769 B2 * 2/2014 Mikami et al. ............... 358/1.14
2004/0260919 A1 12/2004 Takahashi

FOREIGN PATENT DOCUMENTS

JP        A-8-295065        11/1996
JP        A-2005-10897       1/2005

* cited by examiner

*Primary Examiner* — Marcus T Riley
(74) *Attorney, Agent, or Firm* — Oliff PLC

(57) ABSTRACT

An information processing device includes an execution unit that executes a control program for causing a functional unit to realize a predetermined function, a memory that stores the control program, a state variable indicating a state of the functional unit, and activation history of either initial activation or second and following activation, in a nonvolatile memory, and a communication unit that causes the execution unit to communicate with the functional unit, wherein the execution unit includes a first procedure where the control program is stored in the memory and the control program is read and is executed, and a second procedure where the control program pre-stored in the memory is read and is executed, refers to the activation history when activation is performed, executes the first procedure in a case of the initial activation, and executes the second procedure in a case of the second and following activation.

14 Claims, 19 Drawing Sheets

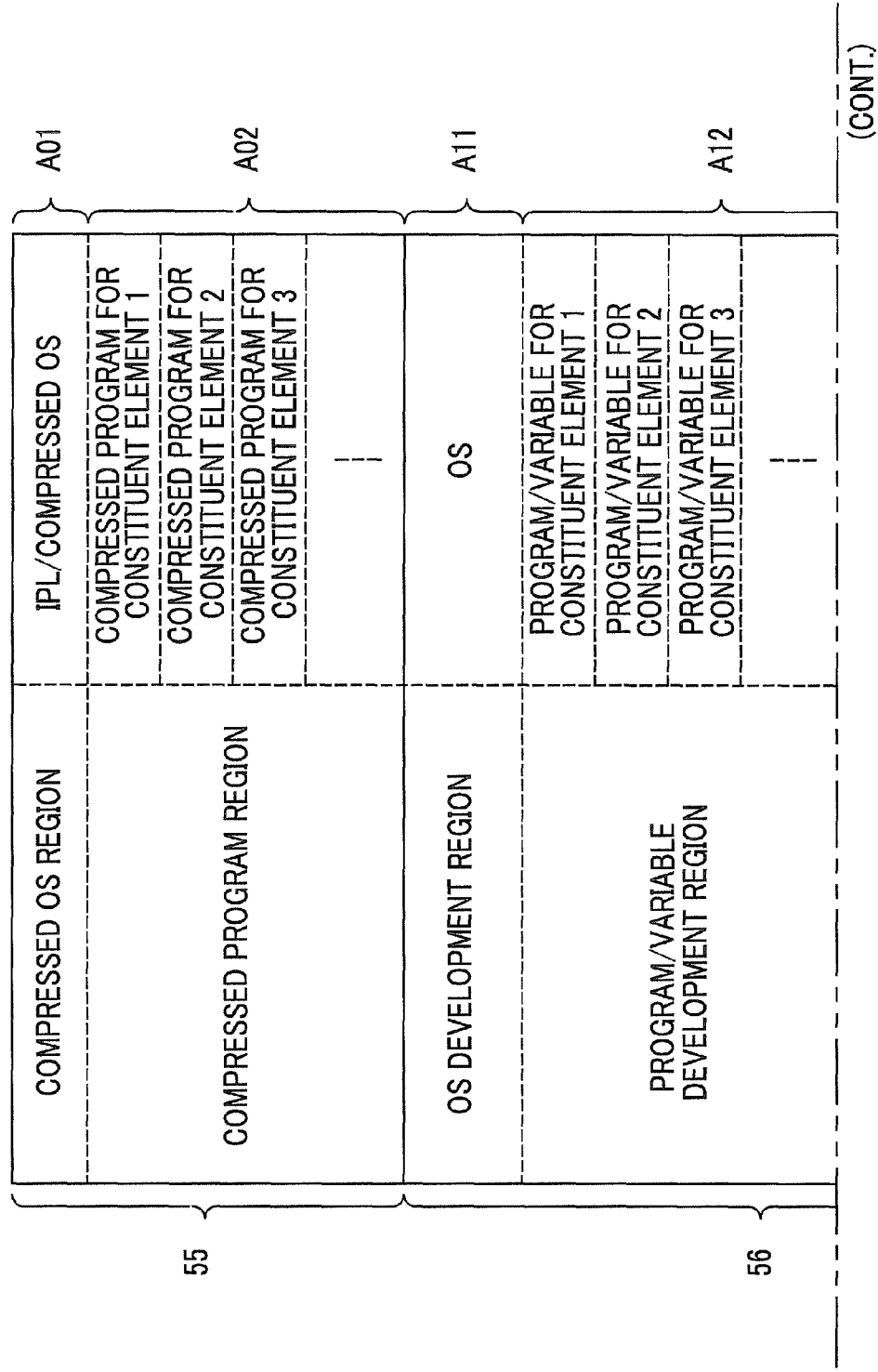

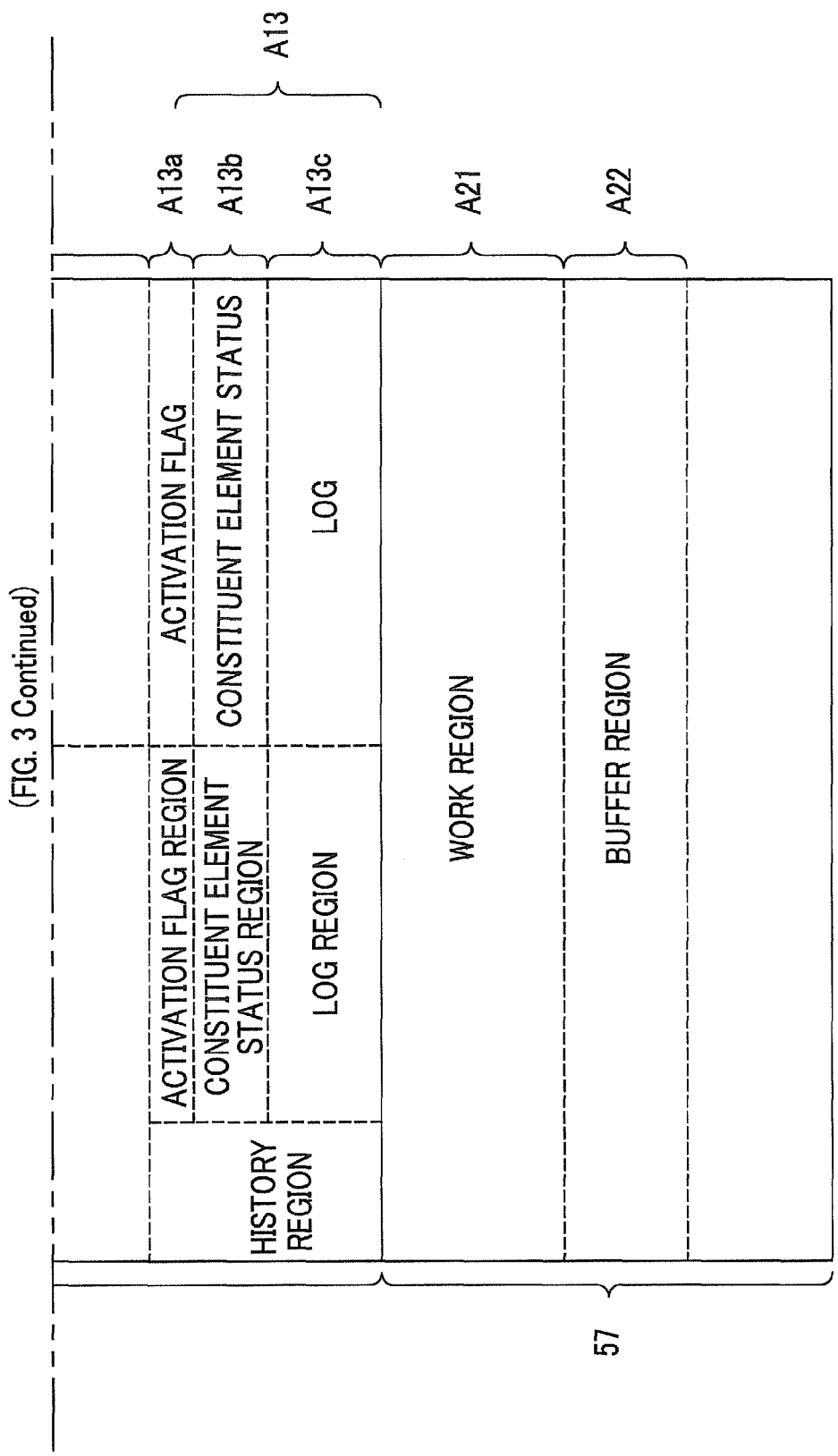

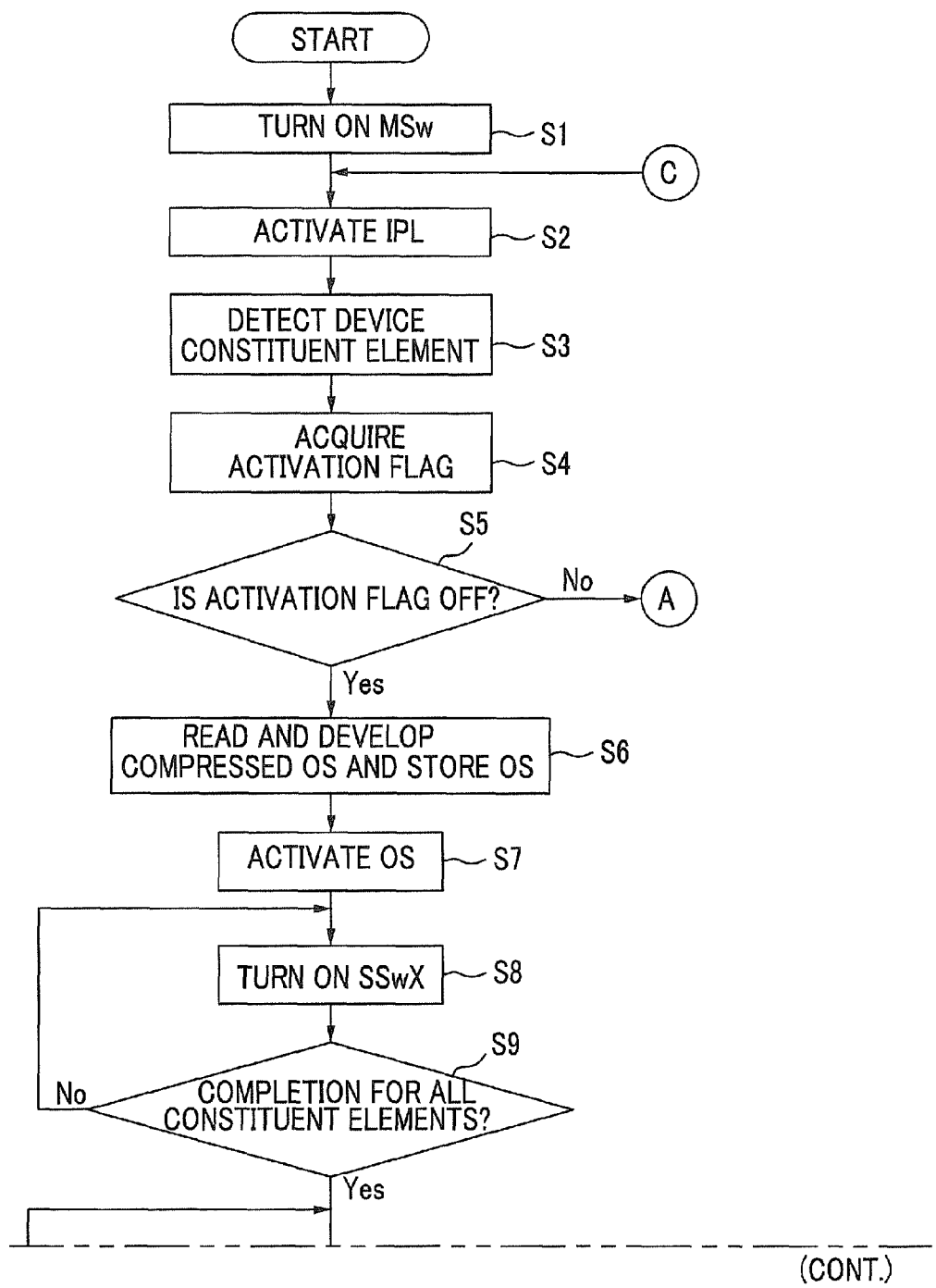

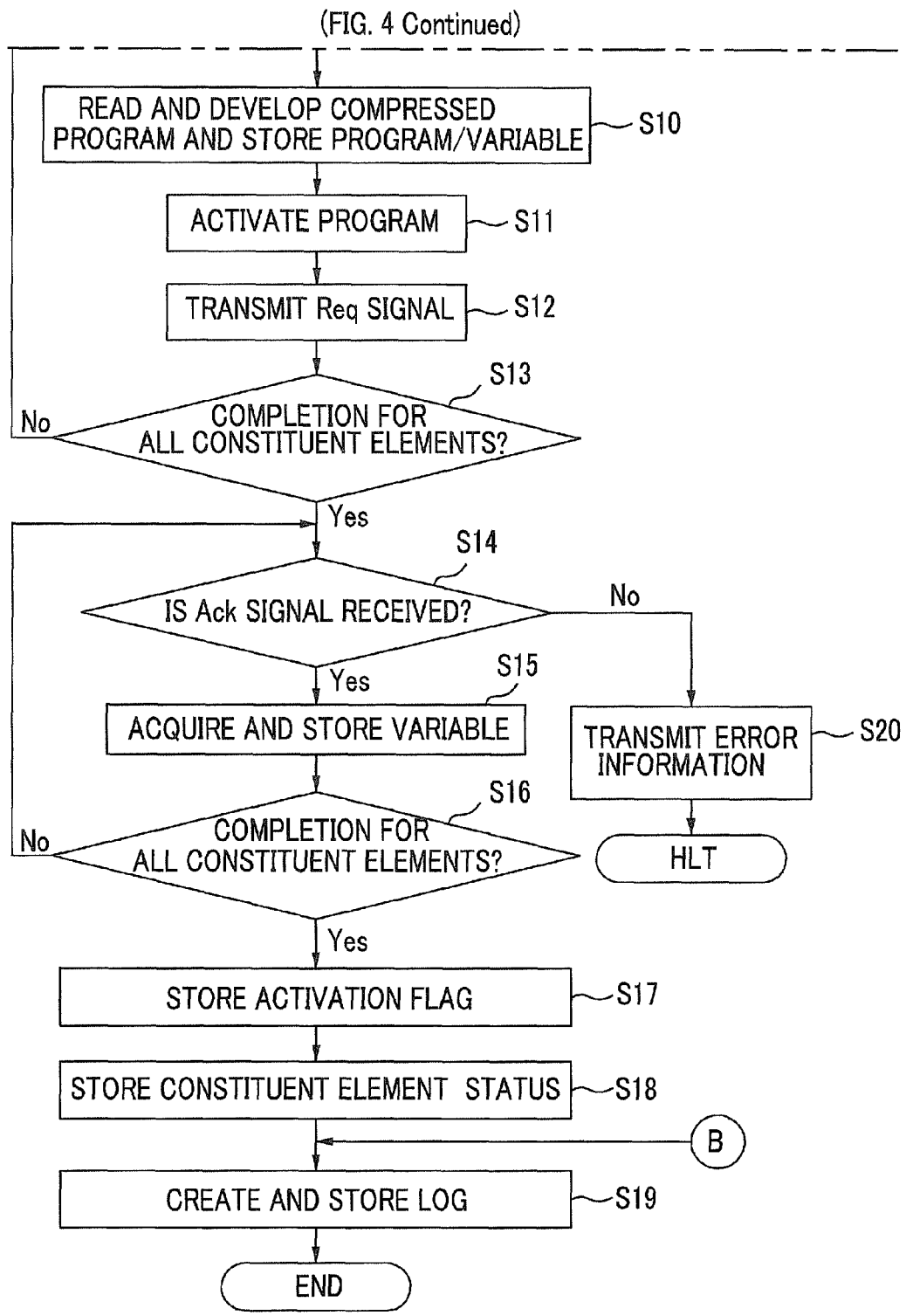

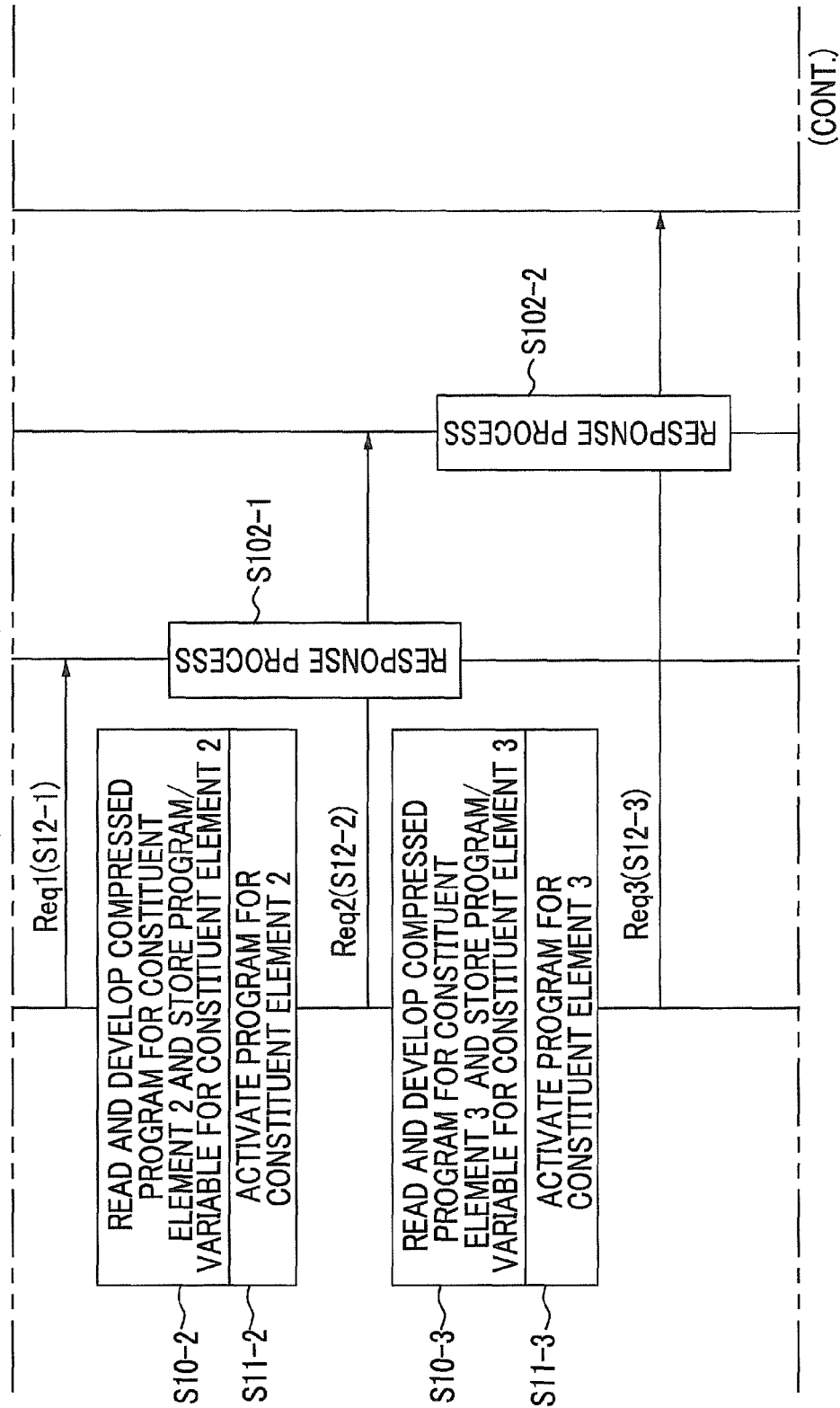

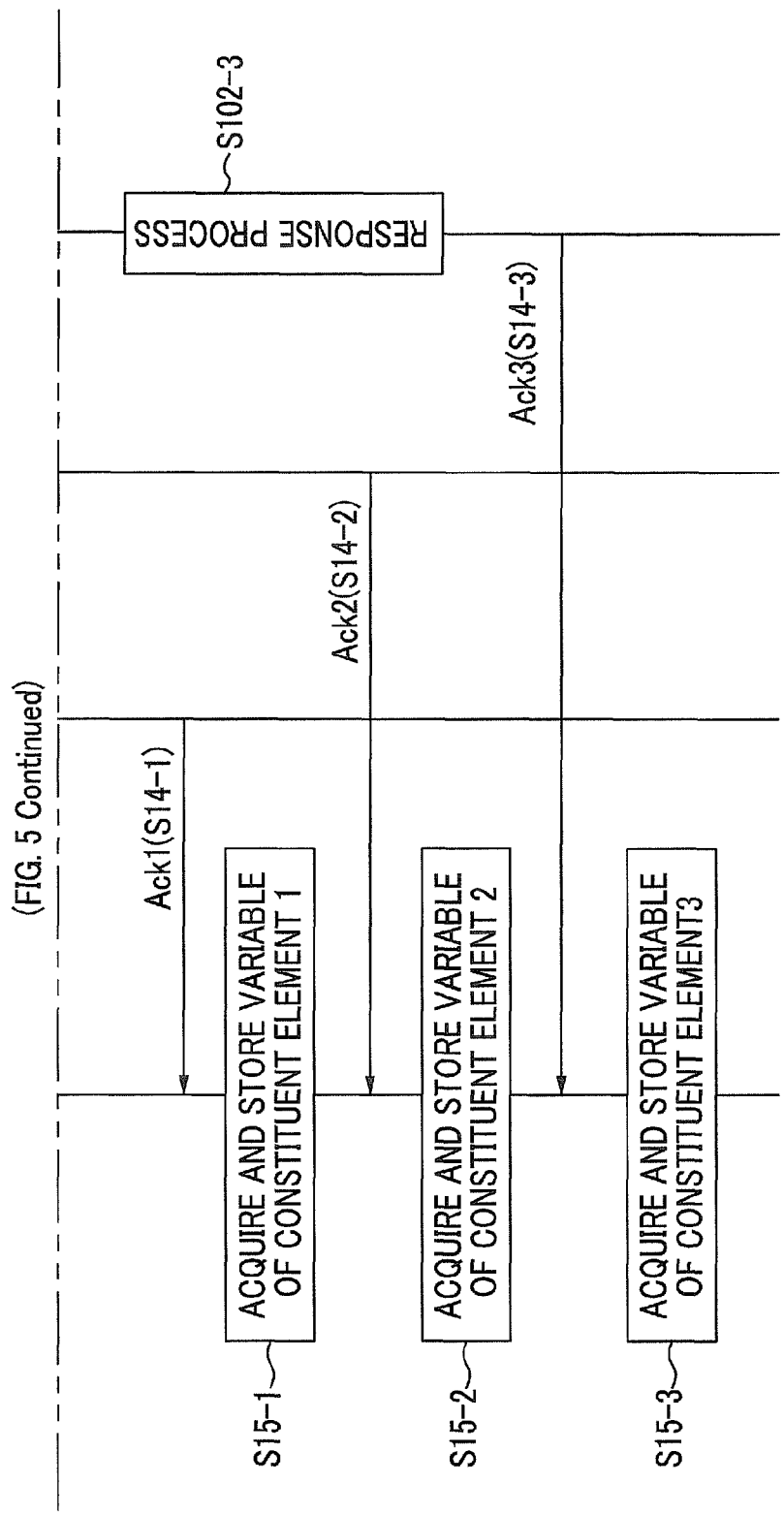

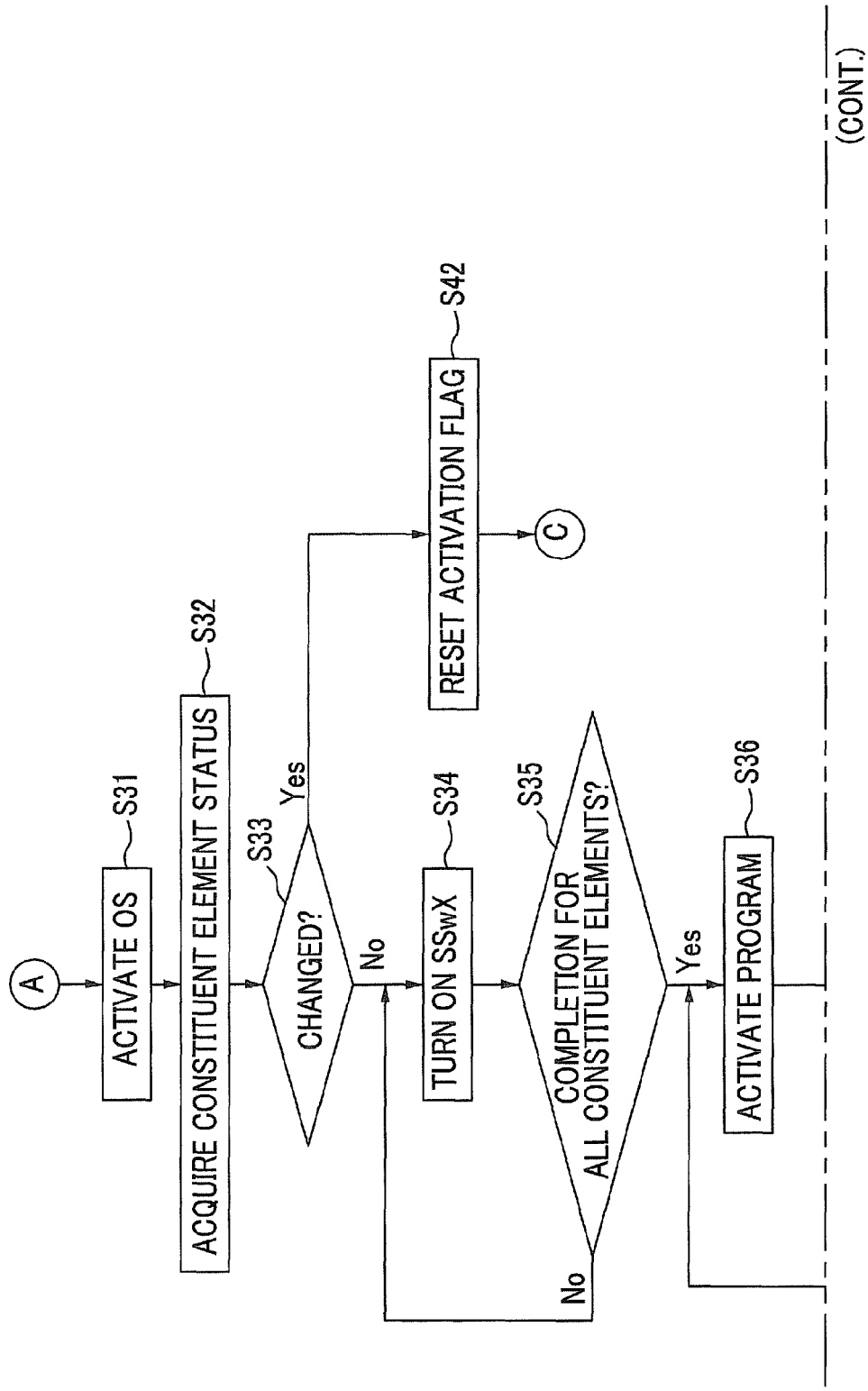

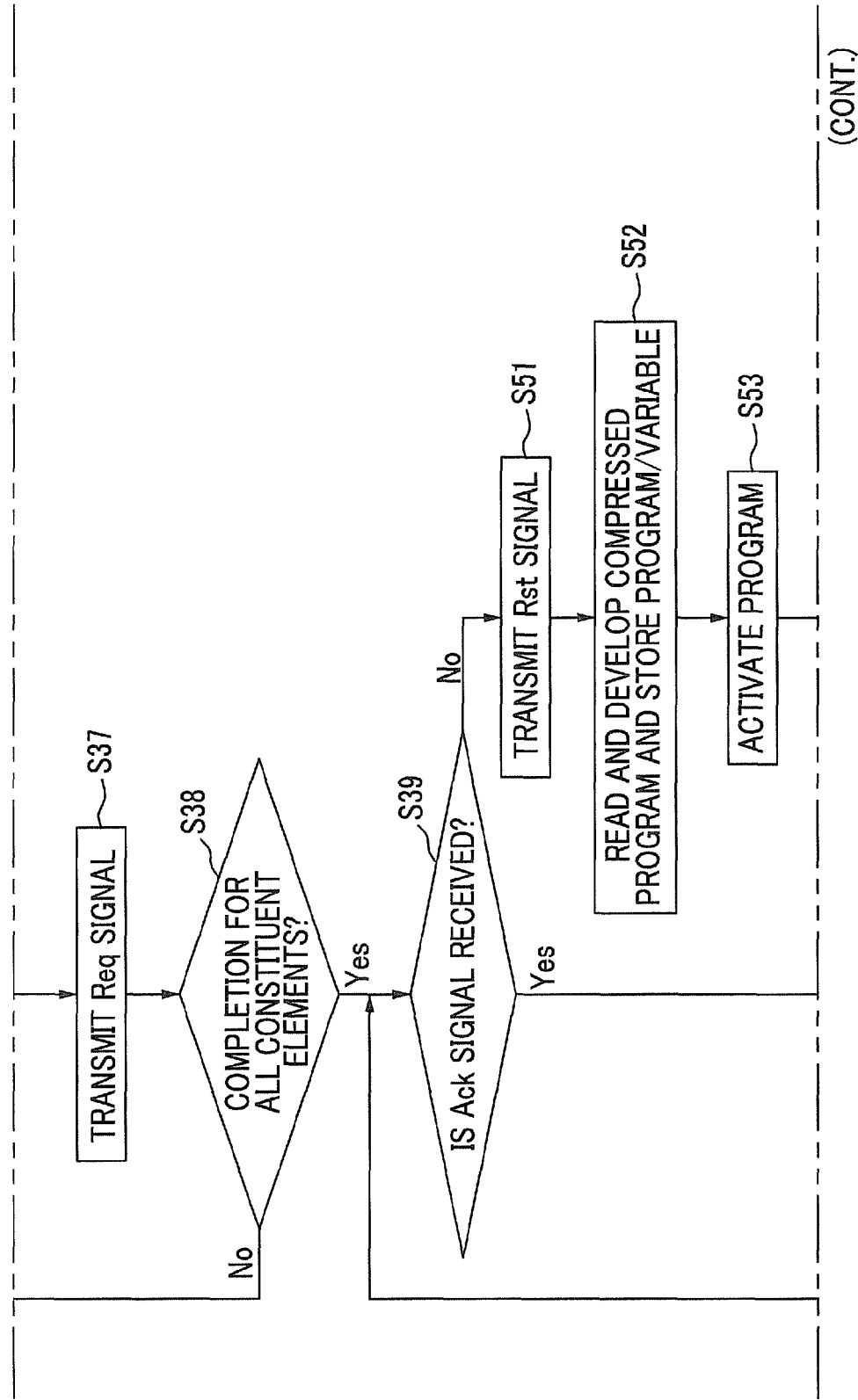

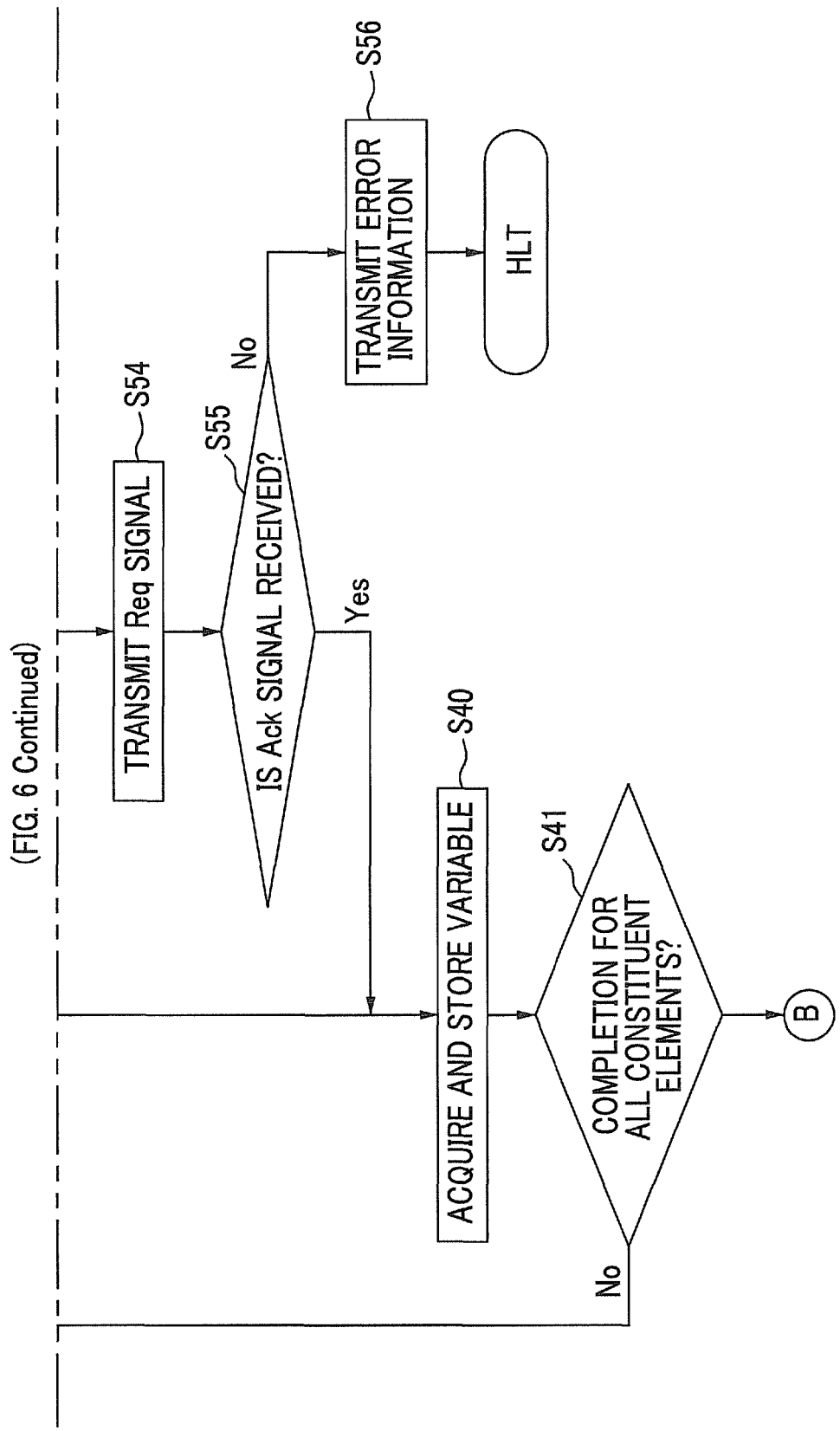

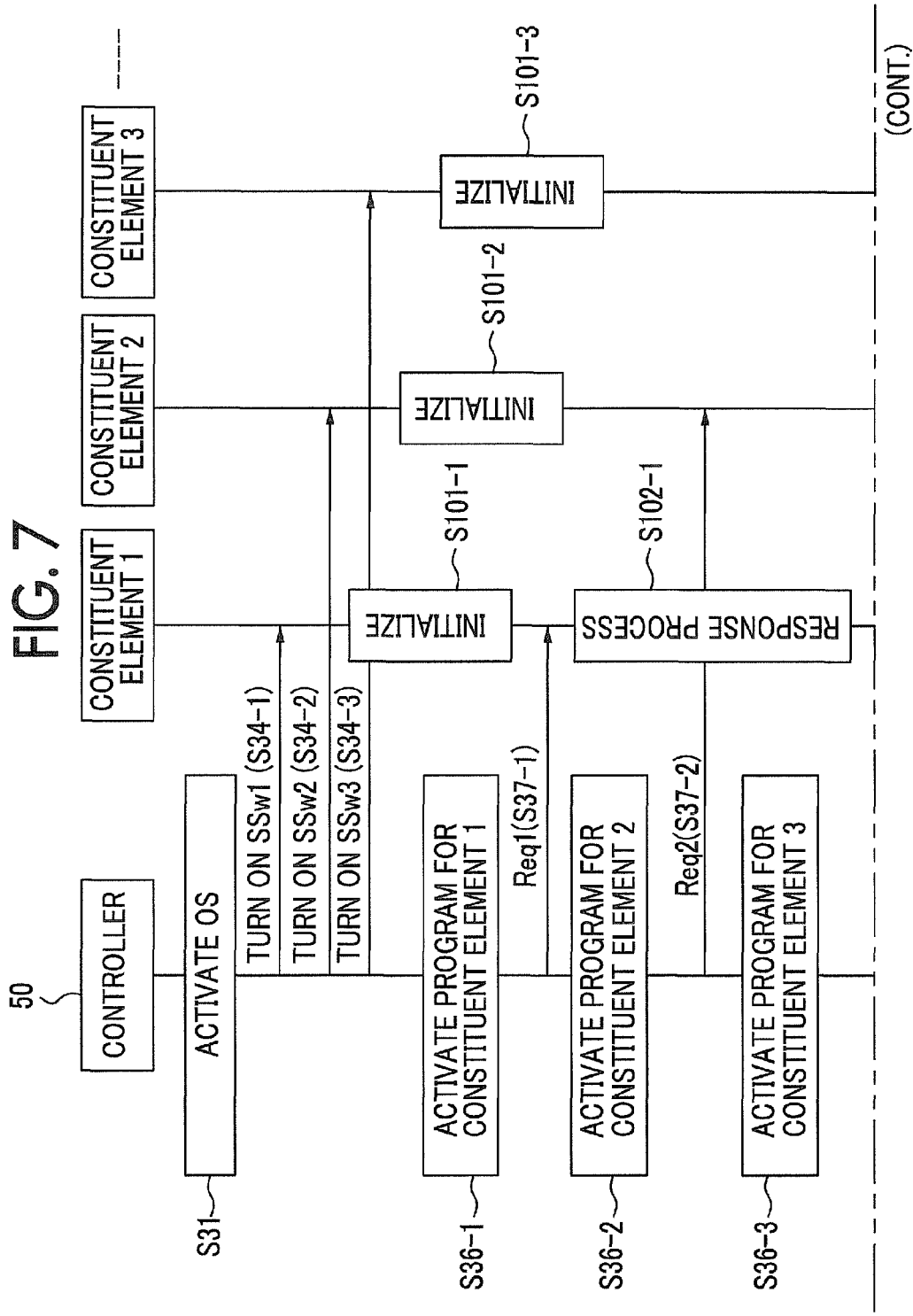

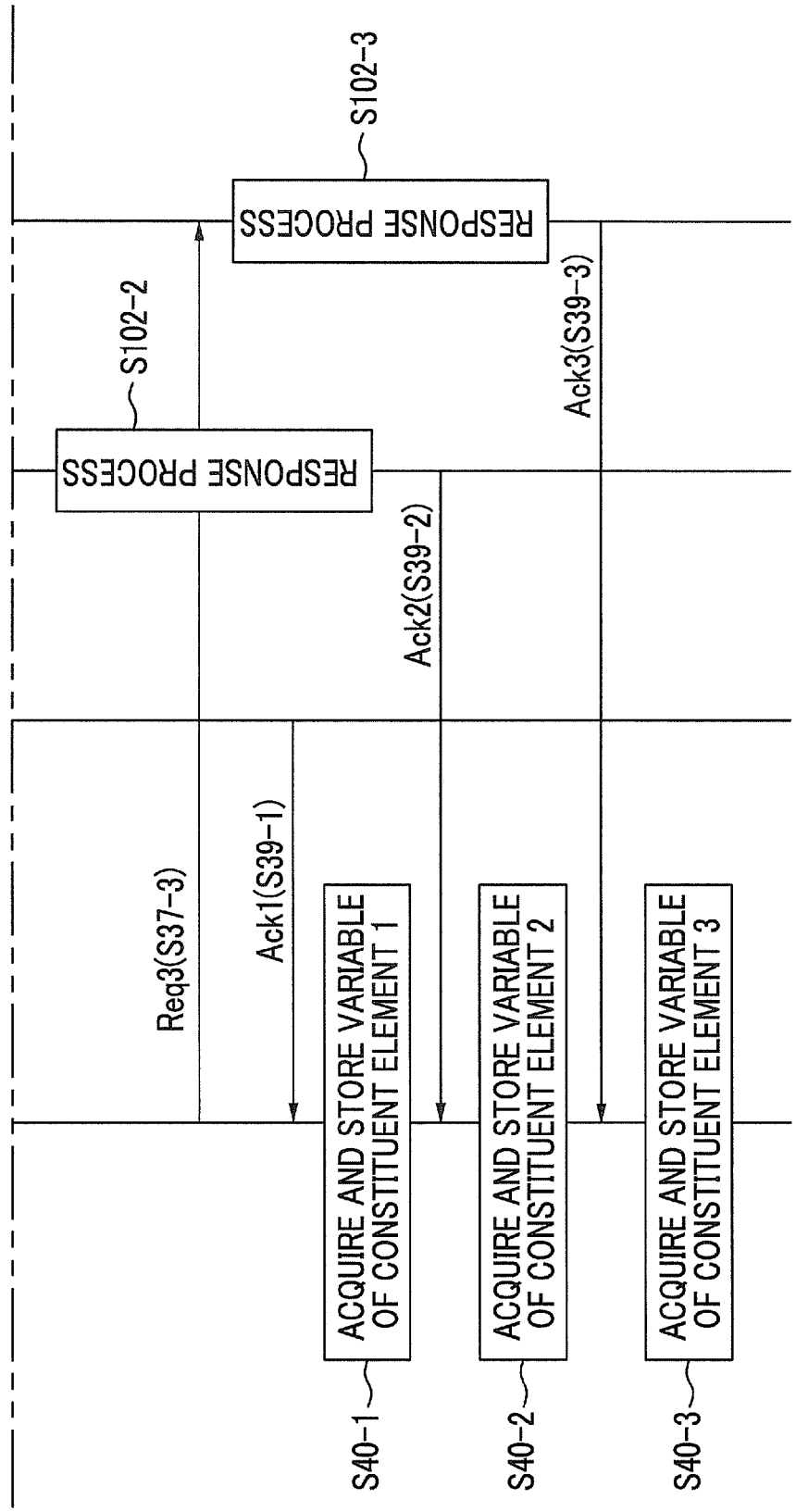

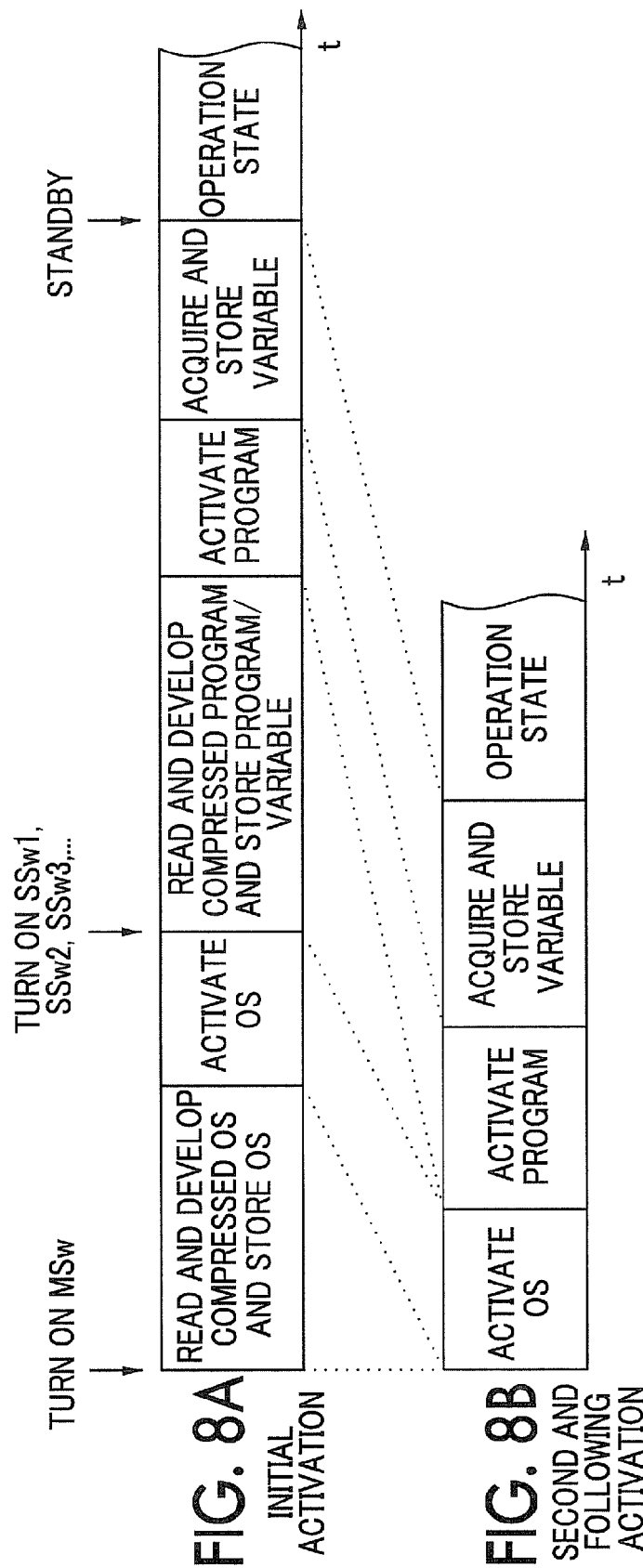

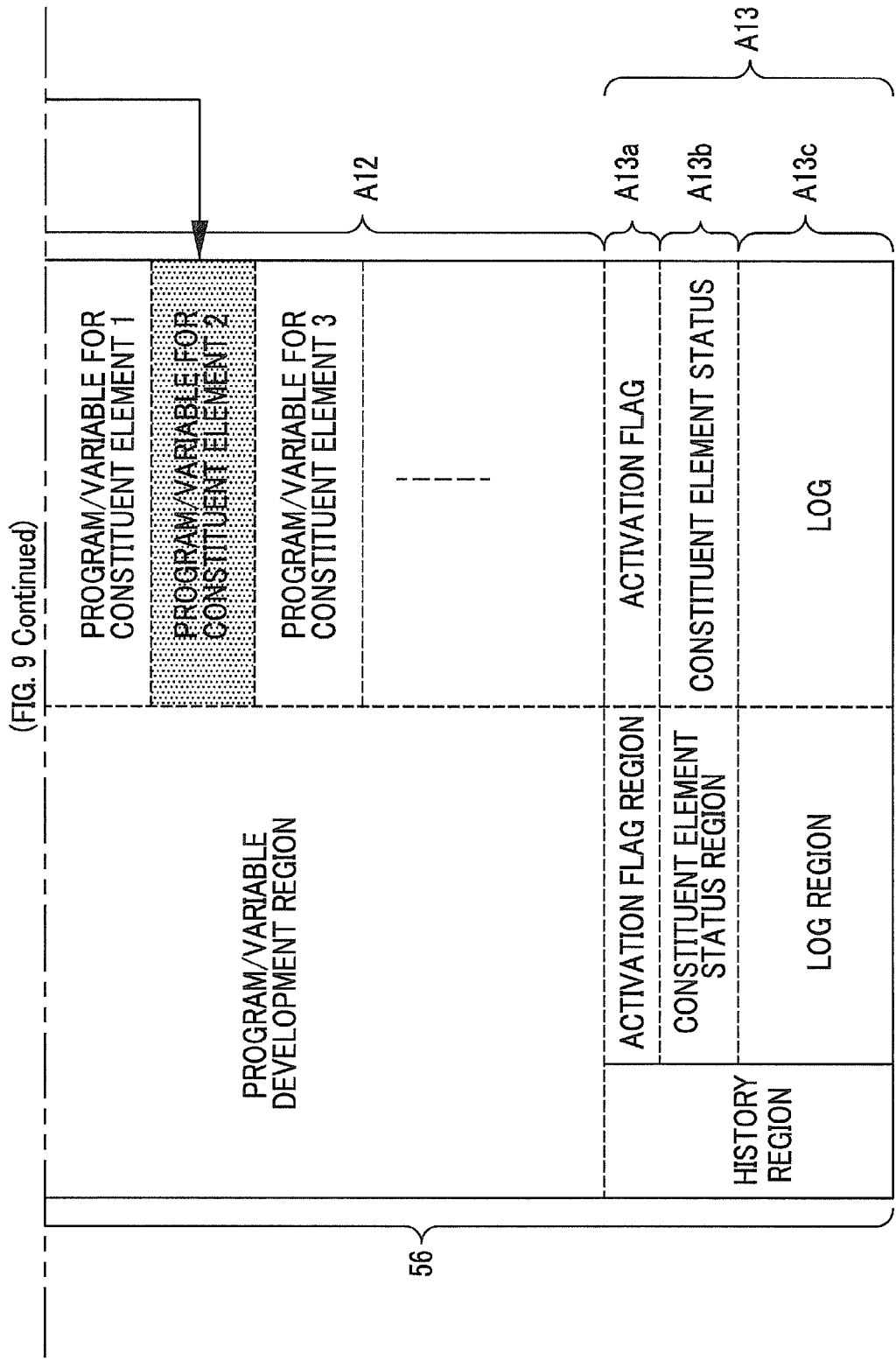

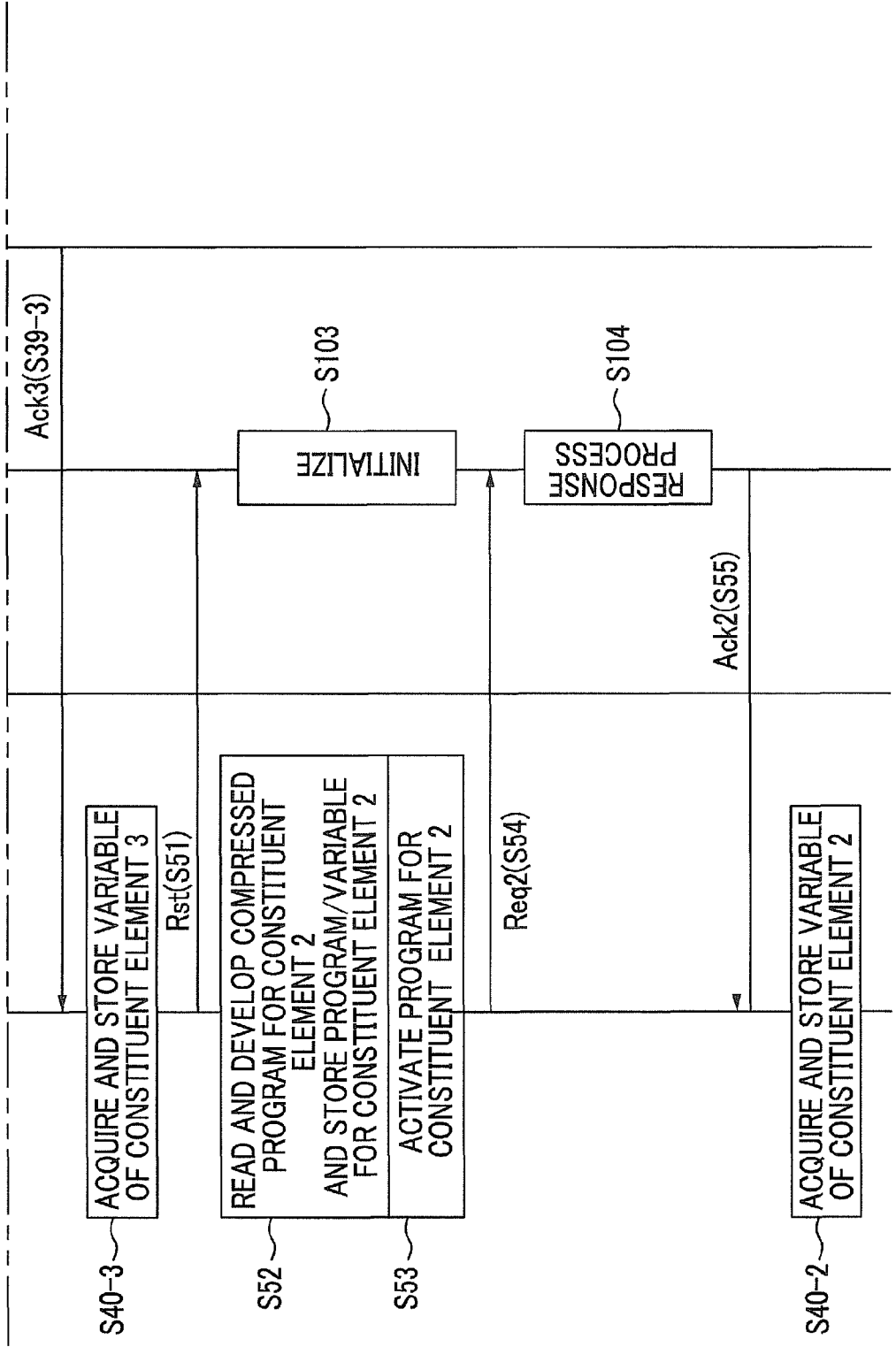

INFORMATION PROCESSING DEVICE, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-049643 filed Mar. 6, 2012.

BACKGROUND

Technical Field

The present invention relates to an information processing device, an image forming apparatus, and a non-transitory computer readable medium.

SUMMARY

According to an aspect of the invention, there is provided an information processing device including an execution unit that executes a control program for causing a functional unit connected to an external device to realize a predetermined function, a memory that stores the control program, a state variable indicating a state of the functional unit, and activation history of either initial activation or second and following activation, in a nonvolatile memory which is readable and writable and maintains information stored therein even if power is not supplied, and a communication unit that causes the execution unit to communicate with the functional unit, wherein the execution unit includes a first procedure where the control program is stored in the memory and the control program is read and is executed, and a second procedure where the control program pre-stored in the memory is read and is executed without storing the control program in the memory, refers to the activation history when activation is performed, executes the first procedure in a case of the initial activation, executes the second procedure in a case of the second and following activation, and acquires a state variable indicating a state of the functional unit through communication with the functional unit with the communication unit and stores the state variable in the memory, so as to be transferred to an operable state.

BRIEF DESCRIPTION OF THE DRAWINGS

Exemplary embodiments of the present invention will be described in detail based on the following figures, wherein:

FIG. 3 is a diagram illustrating an example of the configuration of a memory map formed by a main memory.

FIG. 4 is a flowchart illustrating an activation process of the image forming apparatus.

FIG. 6 is a flowchart illustrating second and following activation processes of the image forming apparatus.

FIG. 7 is a sequence diagram illustrating an example of the communication control between the controller and each constituent element in the second and following activation processes.

FIGS. 8A and 8B are diagrams illustrating the time required for the first activation process and the second and following activation processes through comparison.

DETAILED DESCRIPTION

Hereinafter, exemplary embodiments of the present invention will be described in detail with reference to the accompanying drawings.

Figure 1:
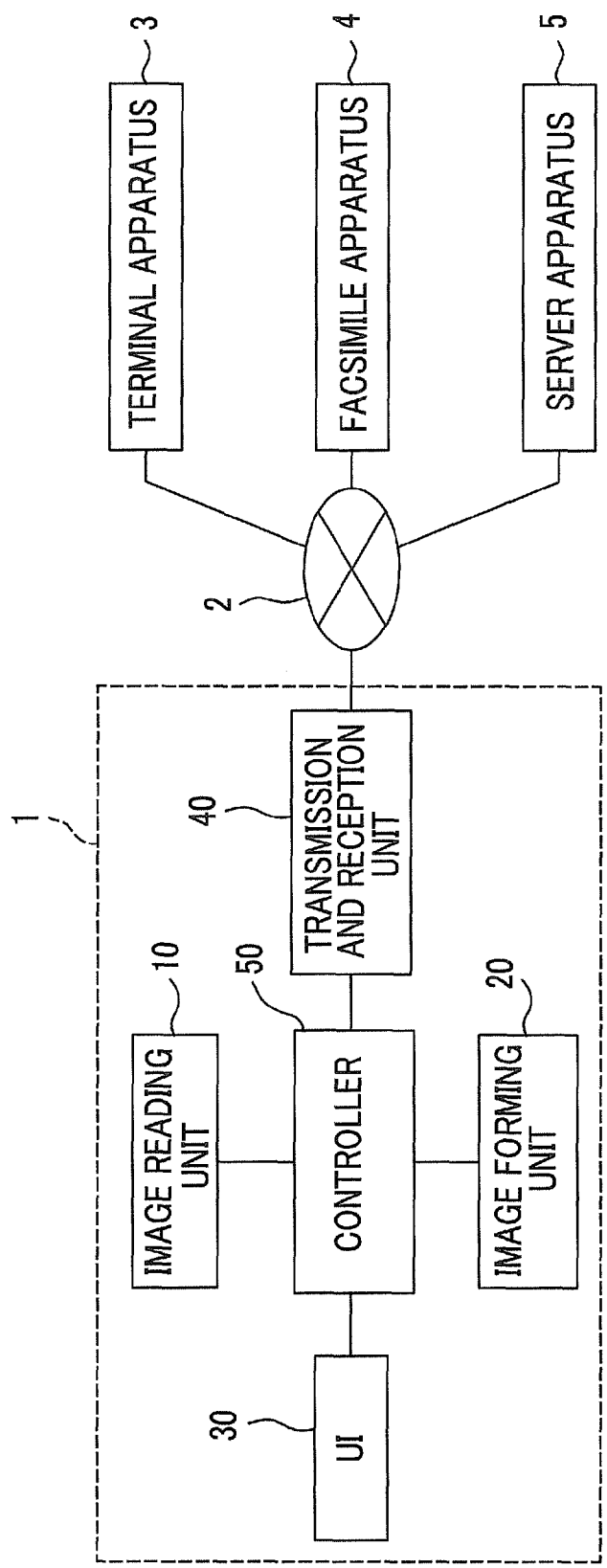
FIG. 1 is a diagram illustrating an example of the configuration of an image forming system according to an exemplary embodiment.

FIG. 1 is a diagram illustrating an example of the configuration of an image forming system according to an exemplary embodiment.

This image forming system includes an image forming apparatus 1 which is operated as a so-called multi-function peripheral having a scanning function, a printing function, a copying function, and a facsimile function, a network 2 connected to the image forming apparatus 1, a terminal apparatus 3 connected to the network 2, a facsimile apparatus 4 connected to the network 2, and a server apparatus 5 connected to the network 2.

Here, the network 2 includes an internet line or a telephone line. In addition, the terminal apparatus 3 instructs the image forming apparatus 1 to form images via the network 2, and includes, for example, a PC (Personal Computer). In addition, the facsimile apparatus 4 transmits and receives facsimiles to and from the image forming apparatus 1 via the network 2. Further, the server apparatus 5 transmits and receives data (including programs) to and from the image forming apparatus 1 via the network 2.

In addition, the image forming apparatus 1 includes an image reading unit 10 which reads images recorded on a recording material such as paper, an image forming unit 20 which forms images on a recording material such as paper, a user interface (UI) 30 which receives instructions related to operations using the scanning function, the printing function, the copying function, and the facsimile function from a user and displays messages to the user, a transmission and reception unit 40 which transmits and receives data to and from the terminal apparatus 3, the facsimile apparatus 4 and the server apparatus 5 via the network 2, and a controller 50 which controls operations of the image reading unit 10, the image forming unit 20, the UI 30, and the transmission and reception unit 40. Further, in the image forming apparatus 1, the scanning function is realized by the image reading unit 10, the printing function is realized by the image forming unit 20, the copying function is realized by the image reading unit 10 and the image forming unit 20, and the facsimile function is realized by the image reading unit 10, the image forming unit 20, and the transmission and reception unit 40. In addition, the transmission and reception unit 40 may be provided as one for the Internet line and one for a telephone line separately.

The image reading unit 10, the image forming unit 20, the UI 30, the transmission and reception unit 40, and the like are an example of the functional units.

Figure 2:
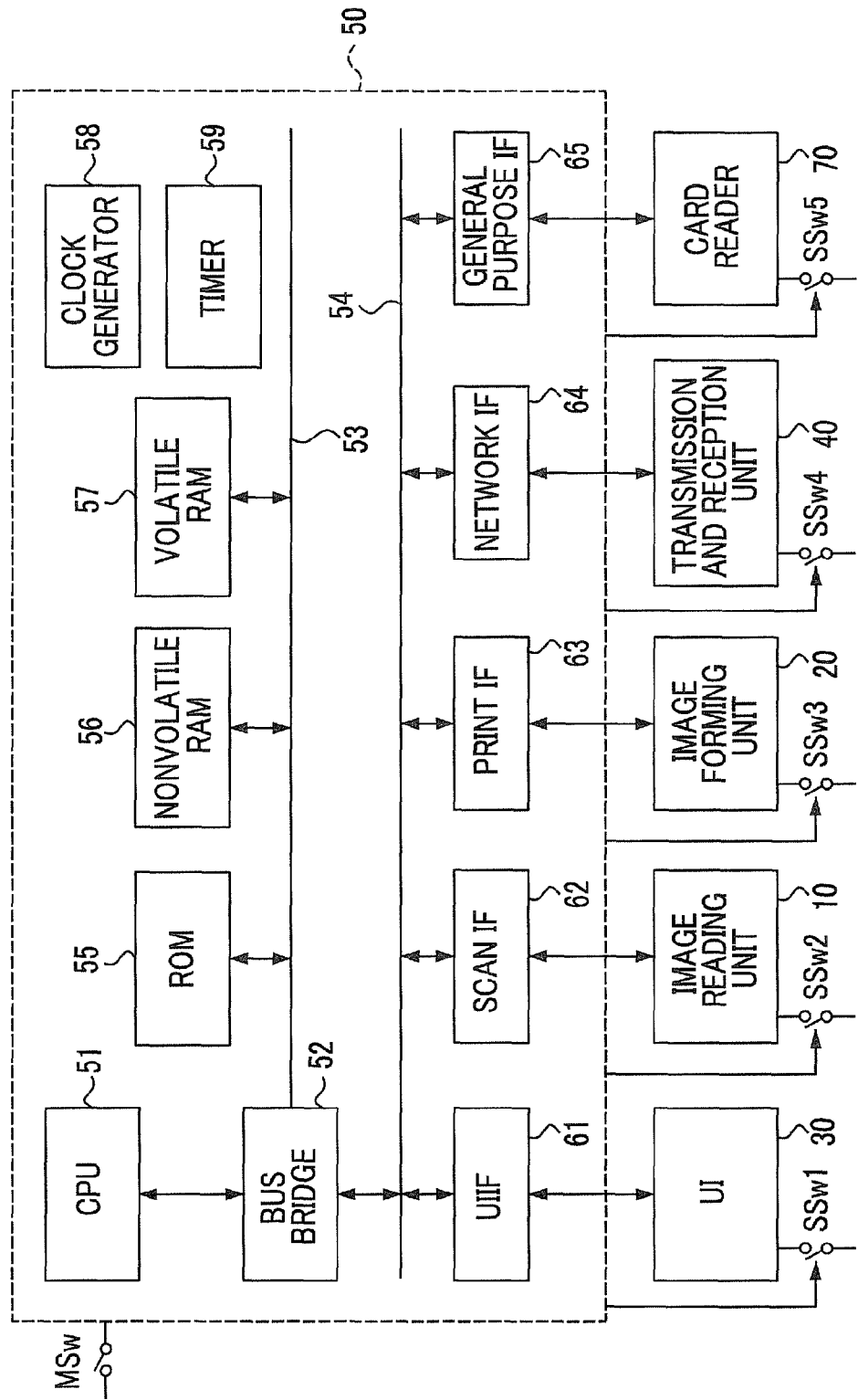
FIG. 2 is a hardware block diagram illustrating an example of the internal configuration of a controller provided in an image forming apparatus.

FIG. 2 is a hardware block diagram illustrating an example of the internal configuration of the controller 50 provided in the image forming apparatus 1 shown in FIG. 1.

The controller 50 as an example of the information processing device includes a CPU (Central Processing Unit) 51 as an example of the execution unit which controls the respective units of the image forming apparatus 1 by executing various operations, and a bus bridge 52 which is connected to the CPU 51 and transmits and receives a variety of data to and from the CPU 51. In the controller 50, the bus bridge 52 is connected to a memory bus 53 which performs transmission and reception of data at a first clock and a PCI (Peripheral Component Interconnect) bus 54 which performs transmission and reception of data at a second clock of lower frequency than the first clock.

In addition, the controller 50 includes a ROM (Read Only Memory) 55, a nonvolatile RAM (Random Access Memory) 56, and a volatile RAM 57. The ROM 55, the nonvolatile RAM 56, and the volatile RAM 57 are connected to the memory bus 53.

Further, the controller 50 includes a UI interface circuit (UI IF) 61 for controlling the UI 30, a scan interface circuit (scan IF) 62 for controlling the image reading unit 10, a print interface circuit (print IF) 63 for controlling the image forming unit 20, a network interface circuit (network IF) 64 for controlling the transmission and reception unit 40, and a general purpose interface circuit (general purpose IF) 65 for controlling a general purpose interface such as a USB (Universal Serial Bus). In addition, the UI IF 61, the scan IF 62, the print IF 63, the network IF 64, and the general purpose IF 65 are connected to the PCI bus 54. In addition, in the exemplary embodiment, a card reader 70 which reads and writes data from and into, for example, an installed memory card is connected to the general purpose IF 65.

The UI IF 61, the scan IF 62, the print IF 63, the network IF 64, the general purpose IF 65, and the PCI bus 54 are an example of the communication unit.

In addition, the controller 50 further includes a clock generator 58 which generates a reference clock which is used as a clock reference where the respective units (the CPU 51 and the like) constituting the controller 50 operate, and a timer 59 which performs clocking according to an operation of the CPU 51 and the like.

The controller 50 is powered on and off by a main switch MSw. In addition, the UI 30, the image reading unit 10, the image forming unit 20, the transmission and reception unit 40, and the card reader 70 are powered on and off by sub-switches SSw1 to SSw5 which are controlled by the controller 50.

The controller 50 in the exemplary embodiment is constituted by, for example, a one-chip microcontroller. However, the controller 50 may be constituted by plural chips.

In addition, in the controller 50 of the exemplary embodiment, the CPU 51 can directly access the ROM 55, the nonvolatile RAM 56, and the volatile RAM 57. In the following description, the ROM 55, the nonvolatile RAM 56, and the volatile RAM 57 connected to the memory bus 53 are collectively referred to as a "main memory" in some cases.

Here, the ROM 55 as a storage device includes a so-called mask ROM, a variety of PROMs (Programmable ROMs: for example, an OTP ROM (One Time Programmable ROM), a UV-EPROM (Ultra-Violet Erasable Programmable ROM), an EEPROM (Electrically Erasable Programmable ROM)), a flash memory, and the like. In addition, in this example, the flash memory is used as the ROM 55.

In addition, the nonvolatile RAM 56 as an example of the storage device includes a nonvolatile memory which can maintain information even if power is not supplied thereto, such as an MRAM (Magnetoresistive RAM), a FeRAM (Ferroelectric RAM), a PRAM (Phase change RAM), a ReRAM (Resistance RAM). In addition, in this example, the MRAM which can read and write data at higher speed than the flash memory used as the ROM 55, is used as the nonvolatile RAM 56.

In addition, the volatile RAM 57 includes a volatile memory which may not maintain information unless power is supplied, such as a DRAM (Dynamic RAM) or an SRAM (Static RAM). Further, in this example, the DRAM is used as the volatile RAM 57.

In the exemplary embodiment, the nonvolatile RAM 56 and the volatile RAM 57 read and write data together at the first clock. For this reason, the nonvolatile RAM 56 has a reading and writing performance equivalent to that of the volatile RAM 57 (in this example, DRAM).

When the main switch MSw is turned off, storage contents of register groups and cache memories (also constituted by a volatile memory) provided in the CPU 51 are cleared. In addition, storage contents of the volatile RAM 57 provided in the controller 50 are also cleared. On the other hand, even if the main switch MSw is turned off, storage contents of the ROM 55 and the nonvolatile RAM 56 provided in the controller 50 are not cleared. Further, the nonvolatile RAM 56 maintains contents stored before the main switch MSw is turned off.

Further, when an initial program loader (IPL) described later is also activated, storage contents of the register groups and the cache memories provided in the CPU 51 are cleared (reset).

FIG. 3 is a diagram illustrating an example of the configuration of a memory map formed by the above-described main memory (the ROM 55, the nonvolatile RAM 56, and the volatile RAM 57).

In this example, a compressed OS region A01 and a compressed program region A02 are disposed in the ROM 55. An OS development region A11, a program/variable development region A12, and a history region A13 are disposed in the nonvolatile RAM 56. In addition, the history region A13 includes an activation flag region A13a which stores an activation flag as an example of the activation history, a constituent element status region A13b which stores a constituent element status, and a log region A13c which stores a log. In addition, a work region A21 and a buffer region A22 are disposed in the volatile RAM 57.

Among them, the compressed OS region A01 disposed in the ROM 55 stores an initial program loader (IPL) and an operation system (OS) (compressed OS) as an example of the compressed basic program, which are programs executed by the CPU 51 in the controller 50, when the image forming apparatus 1 is activated. In addition, the compressed program region A02 disposed in the ROM 55 stores a program as an example of the control program for operating each constituent element capable of being mounted in the image forming apparatus 1 of the exemplary embodiment, and variables as an example of the state variables used in the program, in a state of being collected and compressed for each constituent element. For example, in the example shown in FIG. 3, the compressed program region A02 stores a compressed program (compressed program for constituent element 1) where a program and variables for operating a constituent element 1 are compressed, a compressed program (compressed program for constituent element 2) where a program and variables for operating a constituent element 2 are compressed, a compressed program (compressed program for constituent element 3) where a program and variables for operating a constituent element 3 are compressed, and the like. In addition, the constituent elements 1, 2, 3, . . . , described here respectively correspond to the image reading unit 10, the image forming unit 20, the UI 30, the transmission and reception unit 40, the card reader 70, and the like described above, which are attachable to and detachable from the main body of the image forming apparatus 1, and perform predefined functions singly or along with other constituent elements when installed in the image forming apparatus 1.

As such, in the exemplary embodiment, plural compressed programs corresponding to the respective constituent elements capable of being mounted in the image forming apparatus 1 are stored in advance in the compressed program region A02 disposed in the ROM 55, regardless of constituent elements (the image forming apparatus 1 shown in FIG. 1 does not include the card reader 70) of the image forming apparatus 1 which are actually used. Thereby, exchange of the ROM 55 or update of the programs stored in the ROM 55 due to change in a device constituent element of the image forming apparatus 1 may not be performed.

Next, the OS development region A11 disposed in the nonvolatile RAM 56 stores an OS obtained by the CPU 51 developing (decompressing) the compressed OS stored in the ROM 55.

The program/variable development region A12 stores a program and variables which are obtained by the CPU 51 developing the compressed program read from the above-described compressed program region A02. For example, in the example shown in FIG. 3, the program/variable development region A12 stores a program and variables for operating the constituent element 1 (program/variable for constituent element 1), a program and variables for operating the constituent element 2 (program/variable for constituent element 2), a program and variables for operating the constituent element 3 (program/variable for constituent element 3), . . . .

In addition, the variables are parameters which can be rewritten so as to correspond to variations in functions of the respective constituent elements. The compressed program has an initial value of each of the variables. The variables will be described later.

In addition, in the history region A13 disposed in the nonvolatile RAM 56, the activation flag region A13a stores a flag (activation flag) indicating whether or not the image forming apparatus 1 is activated in the past. Here, the activation flag region A13a stores "On (1)" if the image forming apparatus 1 is activated in the past, and stores "Off (0)" if the image forming apparatus 1 is not activated in the past. In addition, in the history region A13 disposed in the nonvolatile RAM 56, the constituent element status region A13b stores a device constituent element when the image forming apparatus is previously activated (hereinafter, referred to as a "previous device constituent element") as a constituent element status. Here, in the constituent element status region A13b, in relation to each constituent element which may be installed in the image forming apparatus 1, "On (1)" is stored if there is the constituent element, and, "Off (0)" is stored if there is no constituent element. Furthermore, in the history region A13 disposed in the nonvolatile RAM 56, the log region A13c stores contents of instructions received by the image forming apparatus 1, contents when a device constituent element is changed, contents of generated errors, and the like, as log data.

In addition, the work region A21 disposed in the volatile RAM 57 stores data which is temporarily generated when the CPU 51 executes programs. The buffer region A22 disposed in the volatile RAM 57 stores data regarding instructions (data output to the respective IFs (in this example, the UI IF61, the scan IF 62, the print IF 63, the network IF 64, and the general purpose IF 65) via the PCI bus 54) output to each constituent element of the image forming apparatus 1 when the CPU 51 processes data.

Here, the variables are described.

The variables are parameters which are necessary for the controller 50 to refer to when performing functions of each constituent element and vary when each constituent element performs functions. Therefore, the variables may be referred to as parameter variables in some cases.

For example, if a constituent element is the image reading unit 10, the variables are parameters regarding a CCD for performing image reading. Characteristics of the CCD vary with the passage of time or temperature. Therefore, parameters for correcting disparities due to temperature, heat, voltage, and the like of the CCD are necessary as variables. In addition, the variables vary according to variations in states of the image reading unit 10.

If a constituent element is the image forming unit 20, an amount of paper or the like, an amount of toner, and the like are necessary as variables.

In addition, if a constituent element is the transmission and reception unit 40, a calendar, the time of day, a period (timer), and the like are necessary as variables.

As described above, the variables are parameters corresponding to constituent element states, and thus are necessary to read and rewrite from a connected constituent element, for example, even when the image forming apparatus 1 is powered on (main switch MSw described later) and is activated. In addition, in a case where a constituent element is operated and thereby variables vary, the variables are necessary to rewrite for each case of the variation.

For example, if a constituent element is the image forming unit 20, when a cassette holding paper or the like is drawn and inserted, an amount of paper or the like may be increased or decreased. Therefore, the image forming unit 20 acquires variables regarding an amount of paper or the like using the drawing and inserting of the cassette as a trigger and transmits the acquired variables to the controller 50.

In other words, the constituent elements such as the image reading unit 10, the image forming unit 20, and the transmission and reception unit 40 detect variations in the respective states and transmit variables to the controller 50. In addition, in the controller 50, the CPU 51 rewrites variables of the program/variable development region A12 corresponding to each constituent element.

The variables are referred to by the CPU 51 in the controller 50 and are used to control the respective constituent elements such as the image reading unit 10, the image forming unit 20, and the transmission and reception unit 40. In addition, some of the variables are transmitted to the UI 30 and are used for display of states of the constituent elements such as the image reading unit 10, the image forming unit 20, and the transmission and reception unit 40, and issuing of alerts for paper supply request or the like to the user.

Next, an activation process of the image forming apparatus 1 will be described.

FIG. 4 is a flowchart illustrating an activation process of the image forming apparatus 1 shown in FIG. 1. FIG. 4 shows an operation of the CPU 51. Here, the image forming apparatus 1 includes a constituent element 1, a constituent element 2, a constituent element 3, . . . . In addition, the constituent element 1, the constituent element 2, the constituent element 3, . . . are connected to the image forming apparatus 1 via the respective IFs (in the example shown in FIG. 2, the UI IF61, the scan IF 62, the print IF 63, the network IF 64, and the general purpose IF 65) provided in the controller 50 of the image forming apparatus 1. In addition, the controller 50 of the image forming apparatus 1 enters ON and OFF states by the main switch MSw, and the constituent element 1, the constituent element 2, the constituent element 3, ... enter ON and OFF states by sub-switches SSw1, SSw2, SSw3, ... .

When the main switch MSw of the controller 50 is turned on (step S1), the CPU 51 reads the initial program loader (IPL) stored in the OS region A01 of the ROM 55 via the bus bridge 52 and the memory bus 53 and activates the read IPL (step S2).

When the IPL is executed, the CPU 51 first detects device constituent elements of the image forming apparatus 1 using the respective IFs connected via the bus bridge 52 and the PCI bus 54 (step S3). Here, it is assumed that the constituent element 1, the constituent element 2, the constituent element 3, ... included in the image forming apparatus 1 are detected.

In addition, in step S3, for example, a hardware method of detecting whether or not a connector or the like is physically connected to each IF may be used, and, for example, a software method of detecting whether or not communication can be performed with a connection target via each IF may be used.

Next, an activation flag is read and acquired from the activation flag region A13a in the history region A13 of the nonvolatile RAM 56 (step S4). In addition, the CPU 51 determines whether or not the activation flag is Off (0), that is, whether or not the present activation is an initial activation (step S5). Hereinafter, a case where affirmative determination (Yes) is performed in step S4 will be described, and a case (a case of A in FIG. 4) where negative determination (No) is performed will be described later (refer to FIG. 6 described later).

In a case where affirmative determination (Yes) is performed in step S5, that is, the present activation process is an initial activation process, the CPU 51 reads a compressed OS from the compressed OS region A01 of the ROM 55 so as to be developed, and stores the developed OS in the OS development region A11 in the nonvolatile RAM 56 (step S6). In addition, the developed OS (hereinafter, referred to as an OS) is activated from the OS development region A11 in the nonvolatile RAM 56 (step S7). From here, the CPU 51 is changed to the IPL and is controlled by the OS. Here, steps S6 and S7 are an example of the third procedure.

Next, the CPU 51 turns on a sub-switch SSwX (where X is 1, 2, 3, ... ) corresponding to a single constituent element included in the device constituent elements via the controller 50 (step S8). It is determined whether or not the sub-switches SSw1, SSw2, SSw3, ... of all the constituent elements are turned on in the present device constituent elements detected in step S3 (step S9). If negative determination (No) is performed in step S9, the flow returns to step S8 where the sub-switches SSwX of the remaining constituent elements of the present device constituent elements are continued to be turned on. As described above, the sub-switches SSw1, SSw2, SSw3, ... are controlled by the controller 50.

When the sub-switches SSw1, SSw2, SSw3, ... are turned on, the constituent element 1, the constituent element 2, the constituent element 3, ... respectively perform initialization (refer to FIG. 5 described later). Each constituent element includes a processor or a ROM for controlling the constituent element by executing various operations in the same manner as the CPU 51. In addition, when the initialization is performed, stored contents of a register group and a cache memory (also constituted by a volatile memory) provided in the processor are cleared, and then a program for controlling each constituent element is read from the ROM and is set in the register group. Thereby, transition to an operable state is performed.

In addition, the constituent element 1, the constituent element 2, the constituent element 3, ... also perform the initialization when receiving a reset signal Rst as an example of the initialization signal from the CPU 51.

Next, the CPU 51 reads (transmits) a compressed program corresponding to a single constituent element included in the device constituent elements from the compressed program region A02 of the ROM 55, develops the compressed program read, and stores a program and variables obtained by developing the compressed program in the program/variable development region A12 of the nonvolatile RAM 56 (step S10). Thereafter, the CPU 51 activates the program (step S11) and transmits a response request signal Req (denoted by a Req signal in FIG. 4) for establishing communication (synchronizing) with the corresponding constituent element (step S12). Steps S10 and S11 are an example of the first procedure.

In relation to the present device constituent elements detected in step S3, it is determined whether or not storage of programs and variables corresponding to all the constituent elements in the program/variable development region A12, activation of the programs, and transmission of the response request signal Req are completed (step S13). If negative determination (No) is performed in step S13, the flow returns to step S10, compressed programs corresponding to the remaining constituent elements of the present device constituent elements are read, and development of the compressed programs read, storage of programs and variables obtained through the development, activation of the programs, and transmission of the response request signal Req are continued to be performed.

Then, when finishing a process (response process) for the response request signal Req, the constituent element 1, the constituent element 2, the constituent element 3, ... transmit an affirmative response signal Ack to the CPU 51 via the respective IFs.

Therefore, the CPU 51 determines whether or not the affirmative response signal Ack is received (step S14). If affirmative determination (Yes) is performed in step S14, the CPU 51 requests the constituent elements from which the affirmative response signal Ack is received in step S14 to transmit variables and receives the variables. In addition, the CPU 51 stores (rewrites) the variables in regions corresponding to the constituent elements of the program/variable development region A12 of the nonvolatile RAM 56 with the received variables (step S15).

In relation to the present device constituent elements detected in step S3, it is determined whether or not reception of the affirmative response signal Ack corresponding to all the constituent elements, and reception and storage of variables are completed (step S16). If negative determination (No) is performed in step S16, the flow returns to step S14, and reception of the affirmative response signal Ack corresponding to the remaining constituent elements of the present device constituent elements, and reception and storage of variables are continued to be performed.

In addition, if the affirmative response signal Ack is not received in step S14 (negative determination (No) is performed in step S14), the CPU 51 transmits generation of errors (error information) to the UI 30 (step S20), stopping (halt) (denoted by HLT in FIG. 4) may be performed, or, as described later, the reset signal Rst may be transmitted to a constituent element from which the affirmative response signal Ack is not received so as to perform initialization again. In a case where the initialization is performed again, the response request signal Req is transmitted again, and it is determined whether or not the affirmative response signal Ack may be received (refer to FIGS. 6 and 9 described later).

The CPU 51 stores "On (1)" in the activation flag region A13a in the history region A13 of the nonvolatile RAM 56 as an activation flag (step S17). Next, the CPU 51 stores a constituent element status that constituent elements which exist are in an "On (1)" state and constituent elements which do not exist are in an "Off (0)" state, in the constituent element status region A13b in the history region A13 (step S18). In addition, a log on which the device constituent elements and contents of executed processes are reflected is created, and the created log is stored in the log region A13c of the history region A13 (step S19).

In this way, the activation process of the image forming apparatus 1 finishes, and the image forming apparatus 1 enters an operable state (standby state).

When the use of the image forming apparatus 1 finishes, the sub-switches SSw1, SSw2, SSw3, . . . and the main switch MSw are turned off. This is performed through a series of operations where a user gives an instruction for turning off the switches to the UI 30, thus the CPU 51 turns off the sub-switches SSw1, SSw2, SSw3, . . . and then turns off the main switch MSw.

In addition, when the image forming apparatus 1 is not used, in order to reduce power (energy) consumption (save energy), the CPU 51 may perform determination according to predefined conditions, and turn off the sub-switches SSw1, SSw2, SSw3, . . . and the main switch MSw.

Figure 5:
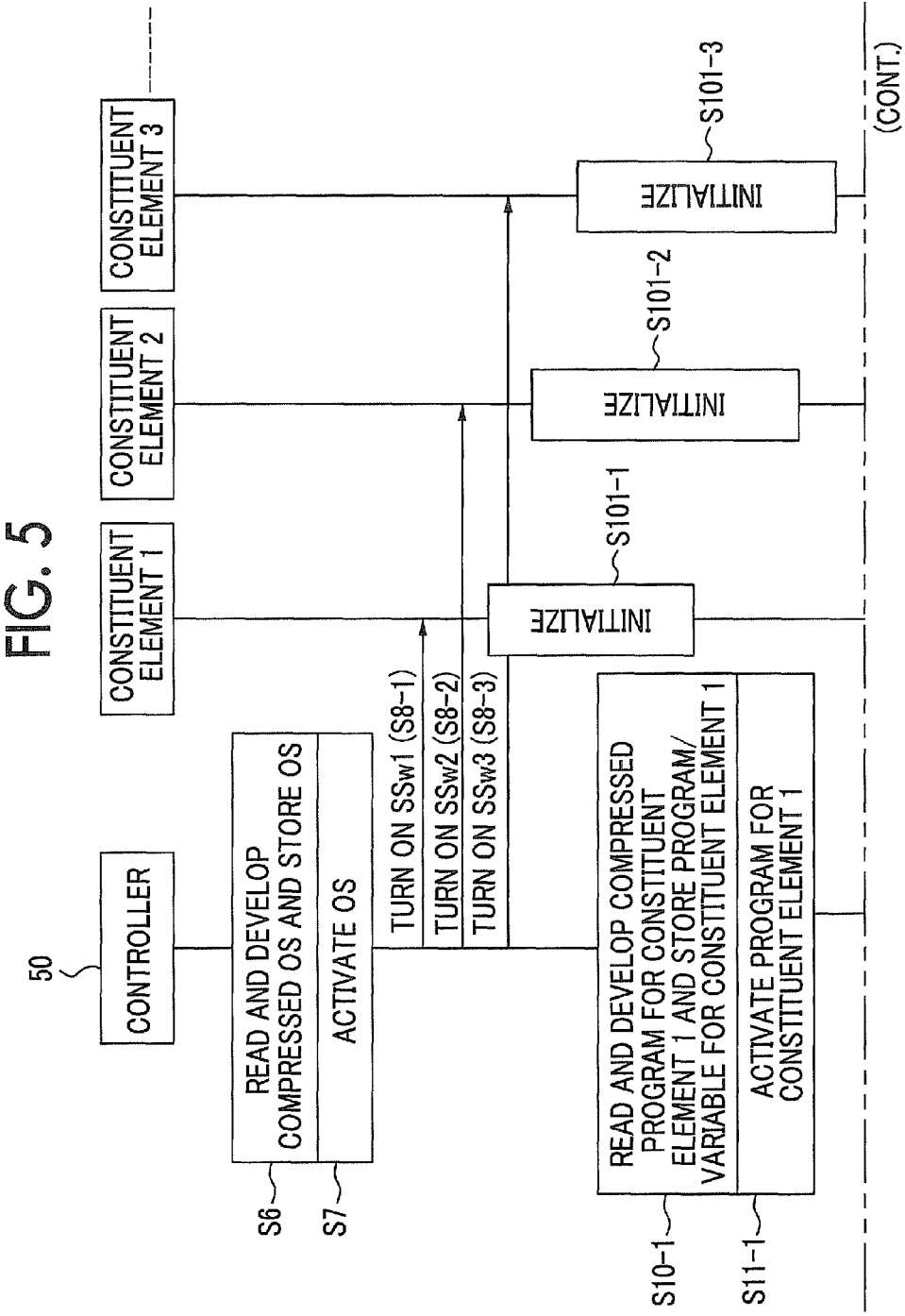
FIG. 5 is a sequence diagram illustrating an example of the communication control between the controller and each constituent element in the first activation process.

FIG. 5 is a sequence diagram illustrating an example of the communication control between the controller 50 and the respective constituent elements (constituent elements 1, 2, 3,) in the initial activation process. In FIG. 5, the time proceeds from the above to the below on the figure. In FIG. 5, the same steps as shown in FIG. 4 are given the same reference numerals. In addition, in a case where the constituent elements 1, 2, 3, . . . respectively are indicated so as to be divided, the numbers of the constituent elements 1, 2, 3, . . . are added following the hyphen (-).

As described above, the controller 50, that is, the CPU 51 (denoted by the controller 50 in FIG. 5, and, hereinafter, denoted by the controller 50 (CPU 51)) performs communication with the constituent elements 1, 2, 3, . . . via the respective IFs so as to acquire variables from the constituent elements 1, 2, 3, . . . provided in the image forming apparatus 1.

The controller 50, that is, the CPU 51 reads and develops a compressed OS, stores the developed OS (step S6), and activates the OS (step S7). In addition, the controller 50 (CPU 51) turns on the sub-switches SSw1, SSw2, SSw3, . . . (steps S8-1, S8-2, S8-3, . . . ). Thereby, each of the constituent elements 1, 2, 3, . . . performs initialization (steps S101-1, S101-2, 101-3, . . . ). The initialization is performed independently for each of the constituent elements 1, 2, 3, . . . .

In addition, the controller 50 (CPU 51) reads and develops the compressed program for constituent element 1, the compressed program for constituent element 2, the compressed program for constituent element 3, . . . corresponding to the constituent elements 1, 2, 3, . . . , stores the developed program/variable for constituent element 1, program/variable for constituent element 2, program/variable for constituent element 3, . . . , and activates the program for constituent element 1, the program for constituent element 2, the program for constituent element 3, . . . (steps S10-1, S10-2, S10-3, . . . , and steps S11-1, S11-2, S11-3, . . . ). Further, response request signals Req1, 2, 3, . . . are respectively transmitted to the constituent elements 1, 2, 3, . . . (steps S12-1, S12-2, S12-3, . . . ).

When receiving the corresponding response request signal Req1, 2, 3, . . . , the constituent elements 1, 2, 3, . . . perform a process (response process) for response to the controller 50 (CPU 51) (steps S102-1, S102-2, S102-3, . . . ). In addition, the constituent elements 1, 2, 3, . . . transmit affirmative response signals Ack1, 2, 3, . . . to the controller 50 (CPU 51).

The controller 50 (CPU 51) receives the affirmative response signals Ack1, 2, 3, . . . from the constituent elements 1, 2, 3, . . . (steps S14-1, S14-2, S14-3, . . . ). Thereby, communication is established between the controller 50 (CPU 51) and each of the constituent elements 1, 2, 3, . . . . Thereafter, the controller 50 (CPU 51) acquires variables from each of the constituent elements 1, 2, 3, . . . , and rewrites variables by storing the variables in corresponding regions (refer to FIG. 3) of the program/variable development region A12 of the nonvolatile RAM 56 (steps S15-1, S15-2, S15-3, . . . ).

Thereby, the image forming apparatus 1 enters an operable state (standby state).

In FIG. 5, the controller 50 (CPU 51) reads and develops the next compressed program and stores the developed program and variables without waiting for reception of the affirmative response signals Ack after transmitting the response request signals Req (for example, the compressed program for constituent element 2 is read and developed in step S10-2 after the response request signal Req1 is transmitted in step S12-1 of FIG. 5). This is because the CPU 51 has a (multitasking) function of capable of executing plural programs in parallel.

When the CPU 51 receives the affirmative response signals Ack while reading and developing the compressed programs and storing the developed programs and variables, the CPU requests for transmission of variables in response thereto.

In addition, the CPU 51 may receive the affirmative response signals Ack after transmitting the response request signals Req, and then may read and develop the next compressed program and store the developed program and variables (single task).

Next, a case where negative determination (No) is performed in step S4 (the case of A in FIG. 4) will be described. The case where negative determination (No) is performed in step 4 is a case of second and following activation processes.

FIG. 6 is a flowchart illustrating the second and following activation processes of the image forming apparatus 1.

Since the acquired activation flag is On (1), the present activation corresponds to the second and following activation. Therefore, an OS and program and variables corresponding to each constituent element are stored in the program/variable development region A12.

Therefore, the CPU 51 activates a developed OS which is stored in the OS development region A11 of the nonvolatile RAM (step S31). In addition, the CPU reads (acquires) a constituent element status from the constituent element status region A13b of the history region A13 of the nonvolatile RAM 56 (step S32).

Further, it is determined whether or not there is a change as compared with the device constituent elements detected in step S3 shown in FIG. 3 (step S33).

Here, if negative determination (No) is performed, a sub-switch SSwX (where X is 1, 2, 3, . . . ) corresponding to a single constituent element included in the device constituent elements is turned on (step S34). It is determined whether or not the sub-switches SSw1, SSw2, SSw3, . . . of all the constituent elements are turned on in the present device constituent elements detected in step S3 shown in FIG. 3 (step S35). If negative determination (No) is performed in step S35, the flow returns to step S34 where the sub-switches SSwX of the remaining constituent elements of the present device constituent elements are continued to be turned on.

In addition, the CPU 51 activates a program corresponding to each constituent element, which is developed and stored in the program/variable development region A12 of the nonvolatile RAM 56 (step S36). Next, the CPU 51 transmits the response request signal Req to each constituent element (step S37). Step S36 is an example of the second procedure.

In relation to the present device constituent elements detected in step S3 shown in FIG. 3, it is determined whether or not activation of corresponding programs and variables and transmission of the response request signal Req are completed (step S38). If negative determination (No) is performed in step S38, the flow returns to step S36, activation of programs corresponding to the remaining constituent elements of the present device constituent elements and transmission of the response request signal Req are continued to be performed.

Then, when executing and finishing a process (response process) for the response request signal Req, each constituent element transmits the affirmative response signal Ack to the CPU 51 via the respective IFs.

Therefore, the CPU 51 determines whether or not the affirmative response signal Ack is received (step S39). Hereinafter, a case where affirmative determination (Yes) is performed in step S39 will be described.

In addition, a case where negative determination (No) is performed in step S39 will be described later.

If affirmative determination (Yes) is performed in step S39, the CPU 51 requests the constituent elements from which the affirmative response signal Ack is received in step S39 to transmit variables and receives the variables. In addition, the CPU 51 stores (rewrites) the variables in regions corresponding to the constituent elements of the program/variable development region A12 of the nonvolatile RAM 56 with the received variables (step S40).

In relation to the present device constituent elements detected in step S3 shown in FIG. 3, it is determined whether or not reception of the affirmative response signal Ack corresponding to all the constituent elements, and reception and storage of variables are completed (step S41). If negative determination (No) is performed in step S41, the flow returns to step S39, and reception of the affirmative response signal Ack corresponding to the remaining constituent elements of the present device constituent elements, and reception and storage of variables are continued to be performed.

Then, the flow returns to B of the flowchart shown in FIG. 4, a log on which contents of the executed processes are reflected is created, and the created log is stored in the log region A13c of the history region A13 (step S19 of FIG. 4).

If negative determination (No) is performed in step S33, that is, the previous device constituent elements are different from the present device constituent elements, for example, the CPU 51 stores "Off (0)" in the activation flag region A13a of the history region A13 of the nonvolatile RAM 56 as an activation flag (reset of the activation flag) (step S42). In addition, the flow may return to C of FIG. 4, and the IPL may be activated in step S2. In this case, the above-described initial activation process is performed.

In addition, based on the present constituent elements, programs and variables which are not stored in the program/variable development region A12 of the nonvolatile RAM 56 may be read and developed from the ROM 55, the developed programs and variables may be stored, the programs may be activated, and then the flow may proceed to step S34. At this time, the flow may not proceed to B of FIG. 3 but returns to step S18 of FIG. 3 such that constituent element statuses corresponding to the present constituent elements are stored in the constituent element status region A13b of the history region A13 of the nonvolatile RAM 56.

FIG. 7 is a sequence diagram illustrating an example of the communication control between the controller 50 and the respective constituent elements (constituent elements 1, 2, 3,) in the second and following activation processes. In FIG. 7, the same steps as shown in FIG. 6 are given the same reference numerals. In addition, in a case where the constituent elements 1, 2, 3, . . . respectively are indicated so as to be divided, the numbers of the constituent elements 1, 2, 3, . . . are added following the hyphen (-).

The controller 50 (CPU 51) activates an OS (step S31), and the controller 50 (CPU 51) turns on the sub-switches SSw1, SSw2, SSw3, . . . (steps S34-1, S34-2, S34-3, . . . ). Thereby, each of the constituent elements 1, 2, 3, . . . performs initialization (steps S101-1, S101-2, S101-3, . . . ). The initialization is performed independently for each of the constituent elements 1, 2, 3, . . . .

In addition, the controller 50 (CPU 51) activates the program for constituent element 1, the program for constituent element 2, the program for constituent element 3, . . . corresponding to the constituent elements 1, 2, 3, . . . (steps S36-1, S36-2, S36-3). Further, response request signals Req1, 2, 3, . . . are respectively transmitted to the constituent elements 1, 2, 3, . . . (steps S37-1, S37-2, S37-3, . . . ).

When receiving the corresponding response request signal Req1, 2, 3, . . . , the constituent elements 1, 2, 3, . . . perform a process (response process) for response to the controller 50 (CPU 51) (steps S102-1, S102-2, S102-3, . . . ). In addition, the constituent elements 1, 2, 3, . . . transmit affirmative response signals Ack1, 2, 3, . . . to the controller 50 (CPU 51).

The controller 50 (CPU 51) receives the affirmative response signals Ack1, 2, 3, . . . from the constituent elements 1, 2, 3, . . . (steps S39-1, S39-2, S39-3, . . . ). Thereby, communication is established between the controller 50 (CPU 51) and each of the constituent elements 1, 2, 3, . . . . Thereafter, when the communication is established between the controller 50 (CPU 51) and each of the constituent elements 1, 2, 3, . . . , the controller 50 (CPU 51) acquires variables from each of the constituent elements 1, 2, 3, . . . , and rewrites variables by storing the variables in corresponding regions (refer to FIG. 3) of the program/variable development region A12 of the nonvolatile RAM 56 (steps S40-1, S40-2, S40-3, . . . ).

Thereby, the image forming apparatus 1 enters an operable state (standby state).

FIGS. 8A and 8B are diagrams illustrating the time required for the first activation process and the second and following activation processes through comparison. FIG. 8A shows the time required for the activation process for the first time (initial activation) and FIG. 8B shows the time required for the activation processes from the second time and thereafter (second and following activation).

As shown in FIG. 8A, in the initial activation process, there is a necessity of the time for reading and development of a compressed OS, storage of the developed OS, reading and development of a compressed program, and storage of developed program and variables. In contrast, in the second and following activation, such time is not necessary, and thus the image forming apparatus 1 can be started in a short time.

As an example, in the initial activation, if 10 seconds for reading and development of a compressed OS, storage of the developed OS, and activation of the OS, and about 30 seconds for reading and development of a compressed program, storage of developed program and variables, and activation of the program are necessary, that is, the time required for the initial activation process is about 40 seconds. In contrast, in the second and following activation, since the OS and the program developed and stored in the nonvolatile RAM 56 are activated, starting can be performed in several seconds.

Since acquisition and storage of variables of each of the constituent elements 1, 2, 3, . . . are necessary for each activation process, the time required for them is long.

As described above, in the exemplary embodiment, it is possible to shorten the time required for the second and following activation processes of the image forming apparatus 1. For this reason, the start time of each constituent element is shortened by employing a fixing device using induction heating (IH) in the image forming unit 20, and thereby the start time of the image forming apparatus 1 is shortened.

Next, referring to FIG. 6 again, if negative determination (No) is performed in step S39, that is, a case where the affirmative response signal Ack is not received from any of the constituent elements 1, 2, 3, . . . will be described.

At this time, the CPU 51 transmits the reset signal Rst to a constituent element (any of the constituent elements 1, 2, 3, . . . ) from which the affirmative response signal Ack is not received, in order to perform an initialization process of the constituent element again (step S51). The constituent element which receives the reset signal Rst performs the initialization process again.

In addition, the CPU 51 reads and develops a compressed program corresponding to the constituent element from the compressed program region A02 of the ROM 55, and overwrites the developed program and variables in a region corresponding to the constituent element of the program/variable development region A12 of the nonvolatile RAM 56 (step S52). In addition, the program is activated (step S53).

Next, the CPU 51 transmits the response request signal Req to the constituent element again (step S54).

Thereafter, the CPU 51 determines whether or not the affirmative response signal Ack is received (step S55). If affirmative determination (Yes) is performed in step S55, the CPU 51 requests the constituent element to transmit variables and receives the variables. In addition, the CPU 51 stores (rewrites) the variables in a region corresponding to the constituent element of the program/variable development region A12 of the nonvolatile RAM 56 with the received variables (step S40).

In relation to the present device constituent elements detected in step S3, it is determined whether or not reception of the affirmative response signal Ack corresponding to all the constituent elements, and reception and storage of variables are completed (step S41). If negative determination (No) is performed in step S41, the flow returns to step S39, and reception of the affirmative response signal Ack corresponding to the remaining constituent elements of the present device constituent elements, and reception and storage of variables are continued to be performed.

Then, the flow returns to B of the flowchart shown in FIG. 4, a log on which contents of the executed processes are reflected is created, and the created log is stored in the log region A13c of the history region A13 (step S19 of FIG. 4).

In addition, if negative determination (No) is performed in step S55, the CPU 51 transmits generation of errors (error information) to the UI 30 (step S56), stopping (halt) (HLT) may be performed.

Figure 9:
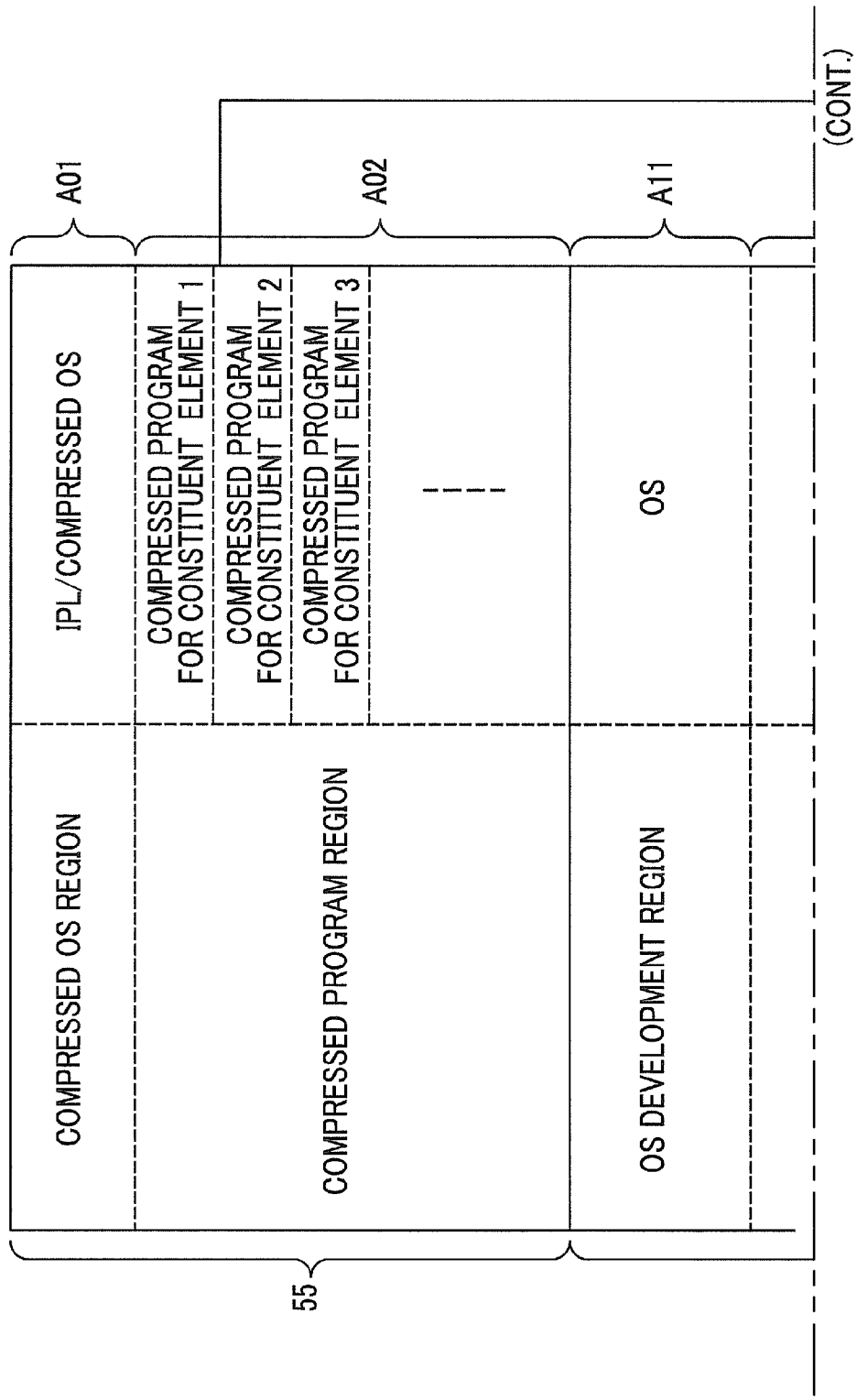
FIG. 9 is a diagram illustrating overwriting of programs and variables in a program/variable development region.

FIG. 9 is a diagram illustrating overwriting of programs and variables in the program/variable development region A12. The CPU 51, in step S52, reads and develops a compressed program corresponding to the constituent element (the constituent element 2 in FIG. 9) from the compressed program region A02 of the ROM 55, and overwrites the developed program and variables in a region corresponding to the constituent element (constituent element 2) of the program/variable development region A12 of the nonvolatile RAM 56.

Figure 10:
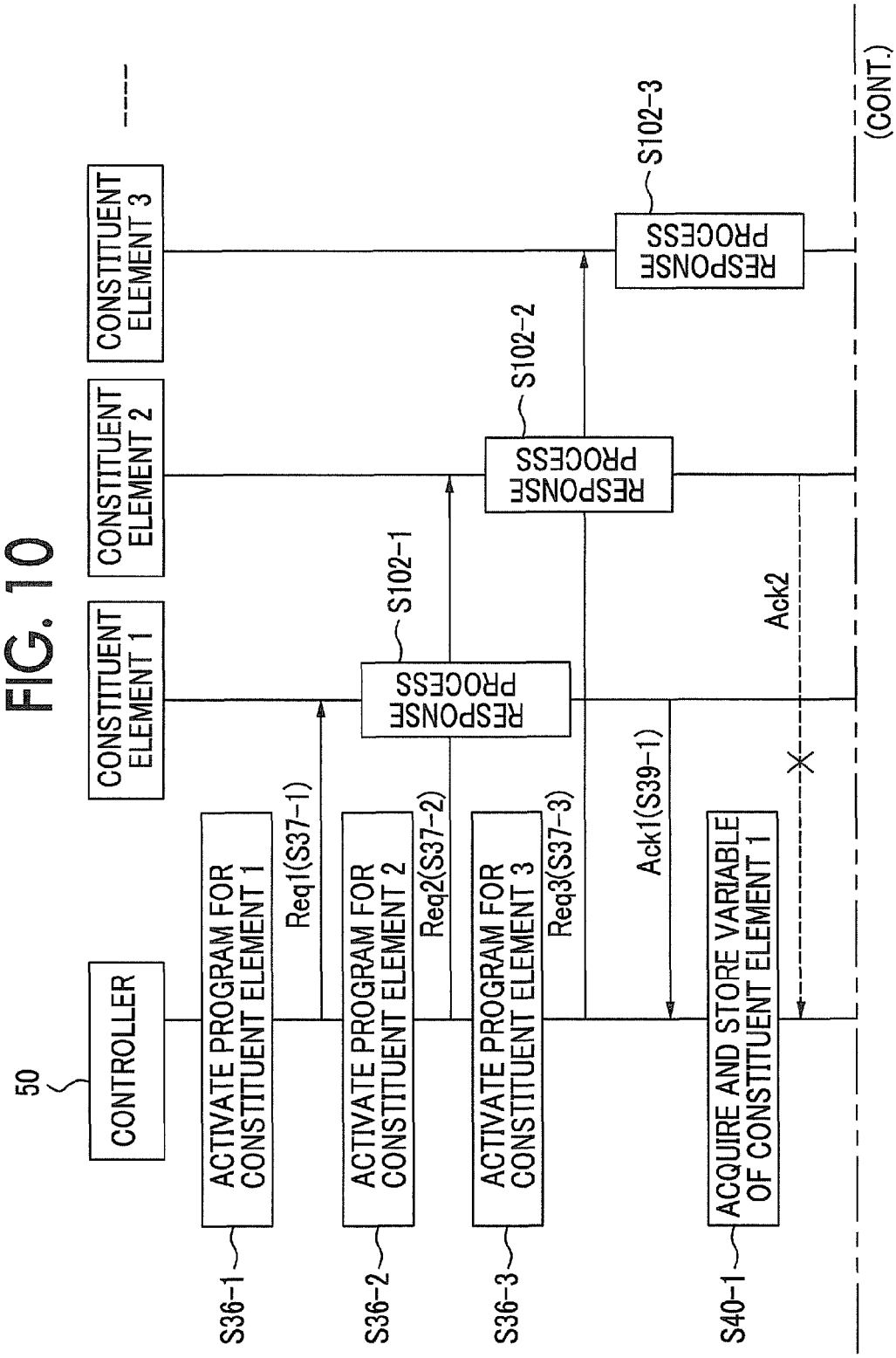
FIG. 10 is a sequence diagram illustrating an example of the communication control between the controller and the respective constituent elements in an activation process when an affirmative response signal is not received from any of the respective constituent elements.

FIG. 10 is a sequence diagram illustrating an example of the communication control between the controller 50 and the respective constituent elements (the constituent elements 1, 2, 3, . . . ) in an activation process when the affirmative response signal Ack is not received from any of the respective constituent elements (the constituent elements 1, 2, 3, . . . ).

In FIG. 10, a description is made from the steps (steps S36-1, S36-2, S36-3, . . . ) where the controller 50 (CPU 51) activates the program for constituent element 1, the program for constituent element 2, the program for constituent element 3, . . . corresponding to the constituent elements 1, 2, 3, . . . in FIG. 7.

Next, the controller 50 (CPU 51) transmits response request signals Req1, 2, 3, . . . to the respective constituent elements 1, 2, 3, . . . (steps S37-1, S37-2, S37-3, . . . ).

Here, it is assumed that the constituent element 2 is not initialized in a normal state.

When receiving the corresponding response request signal Req1, 2, 3, . . . , the constituent elements 1, 2, 3, . . . perform a process (response process) for response to the controller 50 (CPU 51) (steps S102-1, S102-2, S102-3, . . . ).

Then, when finishing the process (response process) for the response request signals Req1, 3, . . . , the constituent element 1, the constituent element 3, . . . transmit affirmative response signals Ack1, 3, . . . to the controller 50 (CPU 51).

The controller 50 (CPU 51) receives the affirmative response signals Ack1, 3, . . . from the constituent elements 1, 3, . . . (steps S38-1, S38-3, . . . ). Thereby, communication is established between the controller 50 (CPU 51) and each of the constituent elements 1, 3, . . . .

In addition, the controller 50 (CPU 51) acquires variables from each of the constituent elements 1, 3, . . . , and rewrites variables by storing the variables in corresponding regions (refer to FIG. 3) of the program/variable development region A12 of the nonvolatile RAM 56 (steps S40-1, S40-3, . . . ).

However, since the constituent element 2 is not initialized in a normal state, even if the response request signal Req2 is received and the response process (step S102-2) is performed, the affirmative response signal Ack2 may not be transmitted to the controller 50 (CPU 51). Therefore, the controller 50 (CPU 51) may not receive the affirmative response signal Ack2 from the constituent element 2.

At this time, in a case where the predefined time set by the timer 59 from the time point when the response request signal Req2 is transmitted is measured, the controller 50 (CPU 51) determines that communication is not established (time-out), and transmits the reset signal Rst to the constituent element 2 (step S51). When receiving the reset signal Rst, the constituent element 2 performs initialization (step S103).

On the other hand, the controller 50 (CPU 51) reads and develops the compressed program for constituent element 2 from the compressed program region A02 of the ROM 55, and overwrites the developed program for constituent element 2 and variables in a region of the constituent element 2 of the program/variable development region A12 (step S52). In addition, the controller 50 (CPU 51) activates the program for constituent element 2 (step S53) and transmits the response request signal Req again (step S54).

When the constituent element 2 enters a normal state through the re-initialization, the constituent element 2 receives the response request signal Req2, performs a response process (step S104), and transmits an affirmative response signal Ack2 to the controller 50 (CPU 51).

In addition, when the controller 50 (CPU 51) may receive the affirmative response signal Ack2 from the constituent element 2 (step S55), communication between the controller 50 (CPU 51) and the constituent element 2 is established. When the communication between the controller 50 (CPU 51) and the constituent element 2 is established, the controller 50 (CPU 51) acquires variables from the constituent element 2, and rewrites variables by storing the variables in a corresponding region of the program/variable development region A12 of the nonvolatile RAM 56 (step S40-2).

As described above, in the exemplary embodiment, for example, in relation to at least one of plural constituent elements, the CPU 51 measures the time after transmission of the response request signal Req using the timer 59, and determines that abnormality is generated as time-out if the affirmative response signal Ack is not received even after the predefined time has elapsed. In addition, the CPU 51 transmits the reset signal Rst to a constituent element from which the affirmative response signal Ack is not received so as to initialize the constituent element, reads and develops a compressed program for the constituent element from the compressed program region A02 of the ROM 55, and overwrites the developed program and variables in a region corresponding to the constituent element of the program/variable development region A12 of the nonvolatile RAM 56. In addition, the CPU 51 activates the program and retransmits the response request signal Req.

As in the above-described example, if there is a problem in initialization of a constituent element, the constituent element may return to a normal state through re-initialization. In this case, the constituent element transmits the affirmative response signal Ack in response to the response request signal Req, and thereby communication is established. The activation process finishes, and the image forming apparatus 1 enters an operable state (standby state).

In addition, even if inconvenience is caused due to rewriting of data of a program stored in the program/variable development region A12 of the nonvolatile RAM 56, a compressed program is read and developed again, and the program is overwritten, thereby returning to a normal state.

In addition, these processes are performed under the control of the CPU 51.

Further, although, in the exemplary embodiment, the compressed program region A02 storing each compressed program is disposed in the ROM 55, the present invention is not limited thereto. In other words, the compressed program region A02 may be disposed in the server apparatus 5 (refer to FIG. 1) connected to the image forming apparatus 1 via the network 2, or a memory card installed in the card reader 70. In addition, in this case, the server apparatus 5 or the memory card installed in the card reader 70 may be set as a target where each compressed program is read when the IPL is executed.

In addition, although, in the exemplary embodiment, the program/variable development region A12 and the history region A13 are disposed in the nonvolatile RAM 56, and the work region A21 and the buffer region A22 are disposed in the volatile RAM 57, the present invention is not limited thereto, and, for example, the program/variable development region A12, the history region A13, the work region A21, and the buffer region A22 may be disposed in the nonvolatile RAM 56. Further, although the compressed OS region A01 and the compressed program region A02 are disposed in the ROM 55, for example, the compressed OS region A01, the compressed program region A02, the program/variable development region A12, the history region A13, the work region A21, and the buffer region A22 may be disposed in the nonvolatile RAM 56.

In addition, although, in the exemplary embodiment, a case where the controller 50 is incorporated into the image forming apparatus 1 has been described as an example, the present invention is not limited thereto and may be applied to an apparatus which is constituted by combinations of plural units and of which a configuration may be modified due to attachment and detachment of the plural units.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
an execution unit that executes a control program for causing a functional unit connected to an external device to realize a predetermined function;
a memory that stores the control program, a state variable indicating a state of the functional unit, and activation history of either initial activation or second and following activation, in a nonvolatile memory which is readable and writable and maintains information stored therein even if power is not supplied; and
a communication unit that causes the execution unit to communicate with the functional unit,
wherein the execution unit includes a first procedure where the control program is stored in the memory and the control program is read and is executed, and a second procedure where the control program pre-stored in the memory is read and is executed without storing the control program in the memory, refers to the activation history when activation is performed, executes the first procedure in a case of the initial activation, executes the second procedure in a case of the second and following activation, and acquires a state variable indicating a state of the functional unit through communication with the functional unit with the communication unit and stores the state variable in the memory, so as to be transferred to an operable state.

2. The information processing device according to claim 1, wherein, when the second procedure is executed, and then an affirmative response to a response request transmitted to the functional unit is not received from the functional unit via the communication unit, the execution unit transmits an initialization signal for instructing initialization to the functional unit via the communication unit and executes the first procedure.

3. The information processing device according to claim 1, wherein the execution unit includes a third procedure where a basic program for controlling the execution unit is stored in the memory and the basic program is read and is executed, and
wherein the third procedure is executed before the first procedure is executed in a case of the initial activation.

4. The information processing device according to claim 2, wherein the execution unit includes a third procedure where a basic program for controlling the execution unit is stored in the memory and the basic program is read and is executed, and wherein the third procedure is executed before the first procedure is executed in a case of the initial activation.

5. The information processing device according to claim 1, further comprising:

a storage unit that stores a basic program or the control program transmitted to the memory in a state of being compressed, wherein the execution unit reads and develops the compressed basic program or control program from the storage unit, and then stores the developed basic program or control program in the memory.

6. The information processing device according to claim 2, further comprising:

a storage unit that stores a basic program or the control program transmitted to the memory in a state of being compressed, wherein the execution unit reads and develops the compressed basic program or control program from the storage unit, and then stores the developed basic program or control program in the memory.

7. The information processing device according to claim 3, further comprising:

a storage unit that stores the basic program or the control program transmitted to the memory in a state of being compressed, wherein the execution unit reads and develops the compressed basic program or control program from the storage unit, and then stores the developed basic program or control program in the memory.

8. The information processing device according to claim 4, further comprising:

a storage unit that stores the basic program or the control program transmitted to the memory in a state of being compressed, wherein the execution unit reads and develops the compressed basic program or control program from the storage unit, and then stores the developed basic program or control program in the memory.

9. The information processing device according to claim 1, wherein the nonvolatile memory is any one of an MRAM, an FeRAM, a PRAM, and a ReRAM.

10. The information processing device according to claim 2, wherein the nonvolatile memory is any one of an MRAM, an FeRAM, a PRAM, and a ReRAM.

11. The information processing device according to claim 3, wherein the nonvolatile memory is any one of an MRAM, an FeRAM, a PRAM, and a ReRAM.

12. The information processing device according to claim 4, wherein the nonvolatile memory is any one of an MRAM, an FeRAM, a PRAM, and a ReRAM.

13. An image forming apparatus comprising:

an image forming unit that forms images on a recording material; and a controller that controls an operation of the image forming unit, wherein the controller includes an execution unit that executes a control program for controlling the image forming unit;

a memory that stores the control program, a state variable indicating a state of the image forming unit, and activation history of either initial activation or second and following activation, in a nonvolatile memory which is readable and writable and can maintain information stored therein even if power is not supplied; and a communication unit through which the execution unit communicates with the image forming unit, wherein the execution unit includes a first procedure where the control program is stored in the memory and the control program is read and is executed, and a second procedure where the control program pre-stored in the memory is read and is executed without storing the control program in the memory, refers to the activation history when activation is performed, executes the first procedure in a case of the initial activation, executes the second procedure in a case of the second and following activation, and acquires the state variable indicating a state of the image forming unit through communication with the image forming unit with the communication unit and stores the state variable in the memory, so as to be transferred to an operable state.

14. A non-transitory computer readable medium storing a program causing a computer to realize the functions of:

executing a control program for causing a functional unit connected to an external device to realize a predetermined function;

storing the control program, a state variable indicating a state of the functional unit, and activation history of either initial activation or second and following activation, in a nonvolatile memory which is readable and writable and can maintain information stored therein even if power is not supplied;

preparing a first procedure where a control program stored in the nonvolatile memory is read and is executed in succession to transmission of the control program to the nonvolatile memory, and a second procedure where the control program pre-stored in the nonvolatile memory is read and is executed in no succession to transmission of the control program to the nonvolatile memory, executing the first procedure if the activation history indicates the initial activation, and executing the second procedure if the activation history indicates the second and following activation, when the activation is performed; and acquiring a state variable indicating a state of the functional unit through communication with the functional unit and storing the state variable in the nonvolatile memory.

* * * * *